United States Patent [19]
Komoto et al.

[11] Patent Number: 6,022,919
[45] Date of Patent: Feb. 8, 2000

[54] COATING COMPOSITION, PROCESS FOR PREPARING COATING COMPOSITION AND PROCESS FOR PREPARING DISPERSING COMPONENT OF INORGANIC OXIDE SOL

[75] Inventors: Keiji Komoto; Keishi Yoshikai; Masahiko Hirono; Yoshifumi Ohama, all of Yokohama, Japan

[73] Assignee: NOF Corporation, Tokyo, Japan

[21] Appl. No.: 08/758,062

[22] Filed: Nov. 27, 1996

Related U.S. Application Data

[63] Continuation-in-part of application No. PCT/JP96/01114, Apr. 24, 1996.

[30] Foreign Application Priority Data

Apr. 28, 1995 [JP] Japan ................................. 7-128998
Dec. 14, 1995 [JP] Japan ................................. 7-346990

[51] Int. Cl.$^7$ ............................. C08J 5/10; C08K 3/10; C08L 33/00
[52] U.S. Cl. ........................ 524/430; 524/409; 524/431; 524/494; 523/200; 523/212; 523/213; 525/124
[58] Field of Search ................................. 524/430, 494, 524/431, 409; 523/200, 203, 212, 213; 525/124

[56] References Cited

U.S. PATENT DOCUMENTS

| | | | |
|---|---|---|---|
| 4,910,097 | 3/1990 | Nomura et al. | 428/623 |
| 4,931,491 | 6/1990 | Savin | 523/443 |
| 5,035,745 | 7/1991 | Lin et al. | 106/287.16 |
| 5,136,004 | 8/1992 | Bederke et al. | 526/273 |
| 5,639,546 | 6/1997 | Bilkadi | 428/331 |

FOREIGN PATENT DOCUMENTS

| | | |
|---|---|---|
| 0286225 | 10/1988 | European Pat. Off. . |
| 58-61829 | 4/1983 | Japan . |
| 60-90270 | 5/1985 | Japan . |
| 1-261409 | 10/1989 | Japan . |
| 2-3468 | 1/1990 | Japan . |
| 4-173882 | 6/1992 | Japan . |
| 4-339868 | 11/1992 | Japan . |
| 5-269365 | 10/1993 | Japan . |

OTHER PUBLICATIONS

Database WPI, Week 9248, (Nov. 1992), Derwent Publications Ltd., AN 394002, XP–002058559, "Composition Metal Precoat" of JP 04 292 677 (Tonen).

Database WPI, Week 9231 ( (Aug. 1992), Derwent Publications Ltd., AN 255779, XP–002058560, "Polyacrylic Resin Coating Composition" of JP 04 173 882 (Tonen).

*Primary Examiner*—Ana Woodward
*Assistant Examiner*—U. K. Rajguru
*Attorney, Agent, or Firm*—Frishauf, Holtz, Goodman, Langer & Chick, P.C.

[57] ABSTRACT

A coating composition which comprises (A) a resin having a glass transition temperature of 50 to 120° C., a number average molecular weight of 2,000 to 100,000, a hydroxyl value of 50 to 150 mgKOH/g and an acid value of 1 to 25 mgKOH/g, which is produced by copolymerizing 10 to 90 percent by weight of (a) a (meth)acrylic acid ester of a $C_1$ to $C_{12}$ alkyl alcohol, 10 to 50 weight % of (b) a first polymerizable double bond-containing and hydroxyl group-containing monomer, 0.1 to 10 weight % of (c) a polymerizable double bond-containing and carboxyl group-containing monomer, 0 to 20 weight % of (d) styrene, 0 to 20 weight % of (e) acrylonitrile and 0 to 10 weight of (f) a second polymerizable double bond-containing monomer, (B) at least one compound selected from the group consisting of a polyisocyanate compound having two or more unblocked isocyanate groups and/or blocked isocyanate groups in the molecule and an aminoplast resin, (C) a dispersing component of at least one inorganic oxide sol selected from the group consisting of an aluminum oxide sol, a silica sol, a zirconium oxide sol and an antimony oxide sol, wherein an amount of a nonvolatile matter of component (C) is 5 to 60 percent by weight based on a total amount of nonvolatile matter of resin (A), compound (B) and component (C). The coating composition provides cured films having excellent weathering resistance, light resistance, stain resistance, stain-removing property, chemical resistance, moisture resistance and appearance and is environmentally friendly and safe.

16 Claims, No Drawings

COATING COMPOSITION, PROCESS FOR PREPARING COATING COMPOSITION AND PROCESS FOR PREPARING DISPERSING COMPONENT OF INORGANIC OXIDE SOL

This application is a continuation-in-part application of International Application No. PCT/JP96/01114, filed Apr. 24, 1996, the entire contents of which are hereby incorporated by reference.

FIELD OF TECHNOLOGY

The present invention relates to a novel coating composition, the more preferable coating composition containing a dispersing component of an inorganic oxide sol prepared by a specific process for preparing, the specific process for preparing the dispersing component of the inorganic oxide sol, and the more preferable coating composition prepared by a specific process for preparing and the specific process for preparing the coating composition. More particularly, it relates a novel coating composition comprising a ceramic ingredient which gives paint film having excellent stain resistance, stain-removing property, weathering resistance, light resistance, chemical resistance, moisture resistance and appearance and is excellent in environment friendliness and safety. Further, it relates a process for preparing the coating composition and a process for preparing a dispersing component of an inorganic oxide sol used in the coating composition.

BACKGROUND TECHNOLOGY

In recent years, many oil droplets and dusts have existed in air by environmental changes such as air pollution. As the result, some problems have occurred, among which paint film on buildings, automobiles and the like are easier to be stained than former and it's stain is difficult to remove. Thus, it has been desired that paint films have resistance to the stain, i.e. stain resistance and property to remove stain from stained paint films, i.e. stain-removing property. In such circumstances, it is desired to produce coating compositions which give paint films having excellent stain resistance, stain-removing property, weathering resistance, light resistance, gloss, appearance, water resistance and chemical resistance and is excellent in environment friendliness and safety property.

Convenient coating compositions having stain resistance which have been used, comprise a fluorine-containing resin as a main component. The stain resistance of the coating compositions is attributed to excellent weathering resistance of the fluorine-containing resin. The fluorine-containing resin manifest the performance by (1) stability caused by larger bond energy between fluorine atom and carbon atom compared with that between hydrogen atom and carbon atom and (2) water repellency and oil repellency caused by larger atomic radius of fluorine atom compared with that of hydrogen atom and lower surface free energy attributed to lower polarizability between fluorine atoms ($0.68 \times 10^{-24}$ cc).

However, there are some problems that the fluorine-containing resin is restricted in the range of resin designation because of different polymerization reactivity compared with general acrylic monomers, attributed to stronger electronegativity of fluorine atom and expensive, and some fluorine-containing monomer is bad in solubility to solvents. Further, there is fear that bad influence to environment may be caused by the production of hydrogen fluoride at stage of waste disposal of the paint film comprising the fluorine-containing resin. Accordingly, though the fluorine-containing resin manifests excellent performance, these problems such as the restriction of cost and use and bad influence to the environment at the waste disposal have been highlighted.

A coating composition, which gives paint films having weathering resistance with an acrylic polyol produced by reacting a polymerizable monomer having stability to ultra-violet rays as essential component, is near recently suggested as a coating composition having excellent weathering resistance (Laid Open Japanese Patent Application Publication Hei 1-261409). But, there is no description about stain resistance in this publication. Also, a coating composition comprising a partial condensate of an organic silicon compound and a specific silica particulate as the coating composition having excellent stain resistance (Laid Open Japanese Patent Application Publication Hei 2-3468). But, there is no specific description about the resin component used in the coating composition in the publication. Further, a coating composition comprising an acrylic polyol resin, a binder, inorganic organo sol and a solvent is suggested (Laid Open Japanese Patent Application Publication Hei 4-173882). But, though the coating composition is improved in stain resistance, weathering resistance and light resistance a little, the coating composition has a defect that the stain-removing property is insufficient.

Thus, the coating composition, which gives paint films having stain resistance, stain-removing property, weathering resistance and light resistance, has been not developed.

The present invention accordingly has an object to provide coating compositions which give paint film having excellent stain resistance, stain-removing property, weathering resistance, light resistance, water resistance, chemical resistance, and appearance and are excellent in environment friendliness and safety property. Another object of the invention is to provide processes for preparing the coating compositions and processes for preparing a dispersing component of an inorganic oxide sol used in the coating compositions.

Extensive investigations undertaken by the present inventors to develop the coating composition having properties described above lead to a discovery that the objects can be achieved by a coating composition comprising a specific acrylic resin, a polyisocyanate compound or an aminoplast resin and a specific ceramic ingredient, that more excellent specified properties can be obtained by mixing the specific ceramic ingredient with the specific acrylic resin at a final stage of the polymerization process of the acrylic resin, and that most excellent specified properties can be obtained by using the ceramic ingredient treated with a specific silane coupling agent.

The present invention was completed on the basis of the discoveries described above.

DISCLOSURE OF THE INVENTION

Thus, the present invention provides a coating composition comprises (A) a resin having a glass transition temperature of 50 to 120° C., a number average molecular weight of 2,000 to 100,000, a hydroxyl value of 50 to 150 mgKOH/g and an acid value of 1 to 25 mgKOH/g, which is produced by copolymerizing 10 to 90 percent by weight of (a) a (meth) acrylic acid ester of an alkyl alcohol of 1 to 12 carbon atoms, 10 to 50 percent by weight of (b) a polymerizable double bond-containing and hydroxyl group-containing monomer, 0.1 to 10 percent by weight of (c) a polymerizable double bond-containing and carboxyl group-containing monomer, 0 to 20 percent by weight of (d)

styrene, 0 to 20 percent by weight of (e) acrylonitrile and 0 to 10 percent by weight of (f) other polymerizable double bond-containing monomer, (B) at least one compound selected from the group consisting of a polyisocyanate compound having two or more unblocked isocyanate groups and/or blocked isocyanate groups in the molecule and an aminoplast resin, (C) a dispersing component of at least one inorganic oxide sol selected from the group consisting of an aluminum oxide sol, a silica sol, a zirconium oxide sol and an antimony oxide sol, wherein an amount of a nonvolatile matter of the said ingredient (C) is 5 to 60 percent by weight based on a total amount of nonvolatile matter.

Further, the present invention provides a process for preparing a coating composition which comprises copolymerizing 10 to 90 percent by weight of (a) a (meth) acrylic acid ester of an alkyl alcohol of 1 to 12 carbon atoms, 10 to 50 percent by weight of (b) a polymerizable double bond-containing and hydroxyl group-containing monomer, 0.1 to 10 percent by weight of (c) a polymerizable double bond-containing and carboxyl group-containing monomer, 0 to 20 percent by weight of (d) styrene, 0 to 20 percent by weight of (e) acrylonitrile and 0 to 10 percent by weight of (f) other polymerizable double bond-containing monomer to produce a resin (A) having a glass transition temperature of 50 to 120° C., a number average molecular weight of 2,000 to 100,000, a hydroxyl value of 50 to 150 mgKOH/g and an acid value of 1 to 25 mgKOH/g, adding a dispersing component of at least one inorganic oxide sol (C) selected from the group consisting of an aluminum oxide sol, a silica sol, a zirconium oxide sol and an antimony oxide sol into a polymerization liquid containing the resin (A) in 5 to 60 percent by weight as nonvolatile matter based on a total amount of nonvolatile matter after finishing of the copolymerization of the resin (A) to produce a organic-inorganic composite, and then mixing at least one compound (B) selected from the group consisting of a polyisocyanate compound having two or more unblocked isocyanate groups and/or blocked isocyanate groups in the molecule and an aminoplast resin with the organic-inorganic composite.

Also, the invention provides a process for preparing a dispersing component of an inorganic oxide sol dispersed in a solvent which comprises dehydrating a dispersing component of an aqueous inorganic oxide sol by azeotropic distillation with an azeotropic solvent to water and then surface-treating the dispersing component with a silane coupling agent.

Other and further objects, features and advantages of the invention will appear more fully from the following description.

PREFERABLE EMBODIMENT FOR PRACTICING THE INVENTION

The resin used as the resin (A) in the coating composition of the invention has a glass transition temperature of 50 to 120° C. When the glass transition temperature is less than 50° C., the obtained paint film has insufficient hardness and the paint film having excellent weathering resistance is difficult to obtain. When the glass transition temperature is more than 120° C., the operation efficiency in coating process is bad and the obtained paint film is lower in appearance such as distinctness of image and gloss. The lower stain-removing property, which is a defect of the coating composition suggested in Laid Open Japanese Patent Applications Hei 4-173882, is improved by controlling the glass transition temperature in the range described above. Preferable glass transition temperature is in the range of 50 to 100° C. in view of hardness, appearance and stain-removing property of the paint film and operation efficiency.

The resin has a number average molecular weight of 2,000 to 100,000. When the number average molecular weight is less than 2,000, the obtained paint film has insufficient weathering resistance. When the number average molecular weight is more than 100,000, the operation efficiency is bad in coating process. The number average molecular weight of the resin (A) is preferably 2,200 to 70,000, more preferably 2,200 to 40,000 in view of weathering resistance of the paint film and operation efficiency.

The resin has a hydroxyl value of 50 to 150 mgKOH/g. When the hydroxyl value is less than 50 mgKOH/g, the obtained paint film has insufficient crosslinking density and the paint film having excellent stain resistance and excellent stain-removing property is difficult to obtain. When the hydroxyl value is more than 150 mgKOH/g, cracks in the paint film is easily caused because contraction stress become large by excessive density of the structure of the paint film at formation of the paint film and is impossible to be relaxed. The hydroxyl value is preferably in the range of 50 to 130 mgKOH/g in view of stain resistance, stain-removing property and the inhibition of cracks of the paint film.

The resin has an acid value of 1 to 25 mgKOH/g. When the acid value is less than 1 mgKOH/g, the dispersibility of pigments in an enamel paint system becomes bad so that objectionable points such as precipitation and aggregation of pigments are caused in storage of the coating composition. When the acid value is more than 25 mgKOH/g, the trend of the extreme decrease in the pot life of the coating composition is observed. The acid value is preferably 2 to 20 mgKOH/g in view of dispersibility of pigments, storage stability and pot life of the coating composition.

The resin of ingredient (A) is produced by copolymerizing essentially (a) a (meth) acrylic acid ester of an alkyl alcohol of 1 to 12 carbon atoms, (b) a polymerizable double bond-containing and hydroxyl group-containing monomer and (c) a polymerizable double bond-containing and carboxyl group-containing monomer, and optionally (d) styrene, (e) acrylonitrile and (f) other polymerizable double bond-containing monomer.

The (meth) acrylic acid ester of an alkyl alcohol of 1 to 12 carbon atoms (hereinafter called "acrylic ester") of component (a) used as the essential monomer component is used in ratio of 10 to 90 percent by weight based on total weight of the all monomers. The acrylic ester is necessary and essential component to control the glass transition temperature of the paint film. When the alkyl group in the portion of the alcohol has carbon atoms of more than 12, the trend of the excess decrease in the glass transition temperature of the obtained resin is observed. When the amount of the acrylic ester is less than 10 percent by weight, it is impossible to control the glass transition temperature of the obtained resin in the range of not less than 50° C. unless other monomers having lower polymerization reactivity are not used. If other monomers having lower polymerization reactivity are used, the weathering resistance of the paint film is decreased. Contrariwise, when the amount of the acrylic ester is more than 90 percent by weight, the desired amount of hydroxyl groups and carboxyl groups is not introduced in the resin and the paint film having excellent weathering resistance, stain resistance and stain-removing property is difficult to obtain. A preferable amount of the acrylic ester is 35 to 80 percent by weight in order to obtain the paint film having desired and preferable properties.

The alkyl alcohol of 1 to 12 carbon atoms which constitute the acrylic ester of component (a) may be a straight chain alcohol, a branch chain alcohol or an alcohol having a cyclic alkyl group. Examples of acrylic esters of component (a) are, for example, methylmethacrylate, ethylmethacrylate, n-propylmethacrylate, isopropylmethacrylate, n-butylmethacrylate, isobutylmethacrylate, t-butylmethacrylate, pentylmethacrylate, hexylmethacrylate cyclohexylmethacrylate, 2-ethylhexylmethacrylate adamantylmethacrylate, dodecylmethacrylate, isobornylmethacrylate, methylacrylate, ethylacrylate, n-propylacrylate, isopropylacrylate, n-butylacrylate, isobutylacrylate, t-butylacrylate, pentylacrylate, hexylacrylate, cyclohexylacrylate, 2-ethylhexylacrylate adamantylacrylate, dodecylacrylate, isobornylacrylate. The acrylic esters may be utilized singly or as a combination of two or more members.

The polymerizable double bond-containing and hydroxyl group-containing monomer of component (b) used as essential monomer component is used in ratio of 10 to 50 percent by weight based on total weight of the all monomers. When the amount is less than 10 percent by weight, it is impossible to introduce crosslinking points needed in the obtained resin and to obtain the paint film having excellent weathering resistance, stain resistance and stain-removing property. On the other hand, when the amount is more than 50 percent by weight, the unreacted hydroxyl groups remain in crosslinking reaction between the obtained resin and ingredient (B). Therefore, the water resistance and the moisture resistance are decreased and the decrease of the weathering resistance of the paint film is caused. Further, the crosslinking density of the paint film is excessively increased. A preferable amount of the monomer of component (b) is 10 to 30 percent by weight in order to obtain the paint film having desired properties by introducing the proper number of crosslinking points in the resin.

The polymerizable double bond-containing and hydroxyl group-containing monomer of component (b) has each one or more polymerizable double bonds and one or more hydroxyl groups, preferably one polymerizable double bond and one hydroxyl group.

Examples of the monomer of component (b) is, for example, hydroxyethylmethacrylate, hydroxypropylmethacrylate hydroxybutylmethacrylate, 1,4-butandiolmonomethacrylate, ε-caprolactone adduct of hydroxyethylmethacrylate, ethylene oxide adduct of hydroxyethylmethacrylate, propylene oxide adduct of hydroxyethylmethacrylate, hydroxyethylacrylate hydroxypropylacrylate, hydroxybutylacrylate, 1,4-butandiolmonoacrylate, ε-caprolactone adduct of hydroxyethylacrylate, ethylene oxide adduct of hydroxyethylacrylate, propylene oxide adduct of hydroxyethylacrylate. The monomers of component (b) may be utilized singly or as a combination of two or more members.

The polymerizable double bond-containing and carboxyl group-containing monomer is essentially used in ratio of 0.1 to 10 percent by weight based on total weight of the all monomers. When the amount is less than 0.1 percent by weight, the acid value of the obtained resin is excessively decreased, the dispersibility of pigments in an enamel paint system becomes bad and objectionable points such as precipitation and aggregation of pigments are caused in storage of the coating composition. When the amount is more than 10, the trend of the extreme decrease in storage stability and pot life of the coating composition is observed. The amount of component (c) is preferably 1 to 5 percent by weight, more preferably 1 to 3 percent by weight in view of dispersibility, storage stability and pot life of the coating composition.

The polymerizable double bond-containing and carboxyl group-containing monomer of component (c) has each one or more polymerizable double bonds and one or more carboxyl groups, preferably one polymerizable double bond and one or two carboxyl groups.

Examples of component (c) are, for example, methacrylic acid, acrylic acid, itaconic acid, mesaconic acid, maleic acid, fumaric acid, ω-carboxy-polycaprolactone (n=2) monoacrylate (for example ALONIX M-5300, a product of TOA GOUSEI CHEMICAL INDUSTRY L.T.D.), phthalic acid monohydroxyethylacrylate (for example ALONIX M-5400, a product of TOA GOUSEI CHEMICAL INDUSTRY L.T.D.), acrylic acid dimer (for example ALONIX M-5600, a product of TOA GOUSEI CHEMICAL INDUSTRY L.T.D.). These may be used singly or as a combination of two or more members.

Styrene of component (d) is not essential component and is optionally used to improve appearance such distinctness of image of the paint film. When styrene is used, the amount of styrene is in ratio of not more than 20 percent by weight based on the total weight of all monomers. When the amount of styrene is more than 20 percent by weight, the trend of the decrease in the weathering resistance, stain resistance and stain-removing property of the paint film is observed. The amount of styrene is preferably 1 to 18 percent by weight in view of the balance of appearance such distinctness of image, weathering resistance, stain resistance and stain-removing property of the paint film.

Acrylonitrile of component (e) is not essential component and is optionally used to improve the adhesion of the paint film to a substrate and impact resistance. When acrylonitrile is used, the amount of acrylonitrile is in ratio of not more than 20 percent by weight based on the total weight of all monomers. When the amount of acrylonitrile is more than 20 percent by weight, the trend of the decrease in the weathering resistance, stain resistance and stain-removing property of the paint film is observed. The amount of acrylonitrile is preferably 1 to 18 percent by weight in view of the balance of the adhesion of the paint film to the substrate, weathering resistance, stain resistance and stain-removing property of the paint film.

Another polymerizable double bond-containing monomer of component (f) is not essential component and is optionally used according to substrates and the purpose of use in the designation of the paint film. When other monomer is used, the amount is not more than 10 percent by weight. When the amount of other monomer is more than 10 percent by weight, it is difficult to obtain the paint film having desired properties. The amount of other monomer of component (f) is preferably 1 to 7 percent by weight, when component (f) is used.

Other polymerizable double bond-containing monomer of component (f) has one or more polymerizable double bonds, preferably one polymerizable double bond.

Examples of other monomers of component (f) is, for example, PHOSMER (a product of UNICHEMICAL L.T.D.), glycydilmethacrylate, glycidylacrylate, allylmethacrylate, allylacrylate, 3,4-epoxycyclohexylmethylmethacrylate, 3,4-epoxycyclohexylmethylacrylate, phenylmethacrylate, phenylacrylate, α-methylstyrene, p-vinyltoluene, methacrylamide, acrylamide, N,N-dimethylmethacrylamide, N,N-dimethylacrylamide, methacrylic acid-1, 2,2,6,6-pentamethyl-4-piperidinyl ester, acrylic acid-1,2,2, 6,6-pentamethyl-4-piperidinyl ester, methacrylic acid-2,2,6,6-tetramethyl-4-piperidinyl ester, acrylic acid-2,2,6,6-tetramethyl-4-piperidinyl ester; aliphatic vinylethers such as ethylvinylether, isopropylvinylether, n-propylvinylether, n-butylvinylether, isobutylvinylether, 2-ethylhexylvinylether and cyclohexylvinylether; 2,3-dihydrofuran, 3,4-dihydro-2H-pyran; trimethoxysilylpropylmethacrylate, maleic anhydride, itaconic anhydride, maleic acid ester and fumaric acid ester. These may be utilized singly or as a combination of two or more members.

The resin of ingredient (A) is obtained by copolymerizing the monomers in the ratio described above. The polymerization method is particularly not limited. Various convenient polymerization methods such as solution polymerization in an organic solvent, suspension polymerization, emulsion polymerization, bulk polymerization and precipitation polymerization can be utilized. Also, the embodiment of the polymerization is particularly not limited. For example, radical polymerization, cation polymerization and anion polymerization can be utilized. Preferable the embodiment of the polymerization is radical polymerization in view of industrial point. Examples of polymerization initiators in radical polymerization are, for example, an organic peroxides such as t-butylhydroperoxide, cumenehydroperoxide, t-butylperoxyneodecanate, t-butylperoxypivalate, t-hexylperoxy-2-ethylhexanoate, methylethylketoneperoxide; and an azo initiators such as 2,2'-azobis (2,4-dimethylvaleronitrile), 2,2'-azobis (2-methylpropionitrile) (AIBN) and 2,2'-azobis (2-methylbutironitrile). Of course, other polymerization initiators than the above described polymerization initiators can be used. The polymerization initiators may be utilized singly or as a combination of two or more members.

The polymerization temperature is preferably 60 to 150° C. in general. When the polymerization temperature is less than 60° C., the radical polymerization initiators are difficult to be decomposed and the polymerization reaction is difficult to be proceeded. When the polymerization temperature is more than 150° C., though the radical polymerizaition initiators are decomposed to generate radicals by heating, the life time of the radicals is short and a propagation reaction is difficult to be effectively proceeded. The polymerization time is indiscriminately not determined because of the influence of the polymerization temperature and the other conditions, but is generally sufficient at the level of 2 to 6 hours.

At least one compound selected from the group consisting of a polyisocyanate compound having two or more unblocked isocyanate groups and/or blocked isocyanate groups in the molecule and an aminoplast resin is used as a curing agent of ingredient (B) in the coating composition of the present invention.

Preferable examples of the polyisocyanate compounds having two or more isocyanate groups are, for example, compounds called "iscyanate monomer" such as hexamethylenediisocyanate, isophoronediisocyanate, tolylenediisocyanate, diphenylmethanediisocyanate, xylylenediisocyanate and dicyclohexylmethan-4,4'-diisocyanate; and polyisocyanate derivatives such as biulet compounds, isocyanurate derivatives and trimethylolpropane adducts thereof. The polyisocyanate compound may be utilized singly or as a combination of two or more members.

The polyblocked isocyanate compound contains the compounds produced by blocking a part or all of the isocyanate groups in the polyisocyanate compounds described above with a blocking agent. Examples of the blocking agents, for example, ε-caprolactam; a ketoxime blocking agents such as methylethylketoxime, methylisoamylketoxime and methylisobutylketoxime; a phenol blocking agents such as phenol, cresol, catechol and nitrophenol; an alcohol blocking agents such as isopropanol and trimethylolpropane; and an active methylene blocking agents such as malonic acid ester and acetoacetic acid ester. The polyblockedisocyanate compounds may be utilized singly or as a combination of two or more members.

Preferable examples of the aminoplast resins are melamine resin and guanamine resin. The aminoplast resins may be utilized singly or as a combination of two or more members. The aminoplast resins are not restricted as long as the aminoplast resins have two or more reactive groups in the molecule. Therefore, the melamine resin and the guanamine resin may have one or more triazine rings in the molecule. The reactive groups in the resins include preferably methylol group, imino group and an etherificated methylol group with methanol, butanol or the like.

In the coating composition of the present invention, ingredient (A) and ingredient (B) are formulated in the following ratio. When ingredient (B) is the polyisocyanate compound having two or more unblocked isocyanate groups and/or blocked isocyanate groups in the molecule, a mole ratio of unblocked isocyanate groups and/or blocked isocyanate groups in ingredient (B) to hydroxyl groups in ingredient (A) is preferably 0.6 to 1.6, more preferably 0.8 to 1.2. When the mole ratio is less than 0.6, a part of the hydroxyl groups in the resin of ingredient (A) may not react and remain in the crosslinking reaction of the polyisocyanate compound of ingredient (B) and the resin of ingredient (A), so that the water resistance and moisture resistance of the obtained paint film may decrease and further the weathering resistance of the paint film may cause by the decrease of the water resistance and moisture resistance. On the other hand, when the mole ratio is more 1.6, a part of unblocked isocyanate groups and/or blocked isocyanate groups may not react and remain. In such case, the water resistance and moisture resistance of the obtained paint film may decrease so that the weathering resistance of the paint film may decrease by the decrease of the water resistance and moisture resistance.

When ingredient (B) is the aminoplast resin, the weight ratio of the nonvolatile matter of ingredient (A) to ingredient (B) is preferably in the range of 97:3 to 60:40, more preferably in the range of 95:5 to 65:35, furthermore preferably in the range of 91:9 to 70:30. When the amount of the aminoplast resin is less than formulation ratio of 97:3, the crosslinking density of the paint film is decreased and the desired properties such as solvent resistance of the paint film may not be obtained. When the amount of the aminoplast resin is more than formulation ratio of 60:40, objectionable points such as the decrease of flexibility of the paint film may be caused.

In the coating composition of the present invention, a dispersing component of at least one inorganic oxide sol selected from the group consisting of an aluminum oxide sol, a silica sol, a zirconium oxide sol and an antimony oxide sol is utilized as a ceramic ingredient of ingredient (C). The preferable inorganic oxide sol is a silica sol.

Many of the inorganic oxide sols are generally supplied as aqueous dispersing system. In the case of the aqueous dispersing system, when the coating composition is waterborne system, the dispersing system can be utilized as it is.

When the coating composition is a solution system of an organic solvent, the methods such as phase conversion into the organic solvent can be utilized. Preferable organic solvents include ketone solvents such as methylisobutylketone and cyclohexanone.

The method of phase conversion into the organic solvent includes the method that a water-soluble organic solvent is added into the aqueous dispersing component and a operation of distillation and removal of water is repeated to proceed the phase conversion into the desired organic solvent.

The dispersing component of an silica sol can be produced by adding silicon tetrahalide into water, by adding acid into aqueous sodium silicate solution and the like. Examples of commercial aqueous dispersing components are SNOWTEX-O (trade name, a product of Nissan Chemical Industries, Ltd.) and SNOWTEX-N (trade name, a product of Nissan Chemical Industries, Ltd.). Examples of commercial organic solvent dispersing components are SNOWTEX-MIBK-ST (trade name, a product of Nissan Chemical Industries Co. Ltd.).

The dispersing component of an inorganic oxide sol is preferably a dispersing component of an inorganic oxide sol surface-treated with a silane coupling agent, more preferably a dispersing component of silica sol surface-treated with a silane coupling agent. The surface-treated dispersing component of an inorganic oxide sol can introduce various functional groups on the surface of the particles. Therefore, when the surface-treated dispersing component is used in the coating composition of the present invention, the surface-treated dispersing component easily bonds with organic components such as the resin, the polyisocyanate compound or the aminoplast resin. In such case that the ceramic ingredient chemically bonds with the organic component, the crosslinking of the paint film is tighter than that without chemical bonds and the stain resistance, stain-removing property and weathering resistance are improved.

The silane coupling agents include vinyltrimethoxysilane, vinyltriethoxysilane, γ-methacryloyloxypropyltrimethoxysilane, γ-glycidoxypropyltrimethoxysilane, γ-aminopropyltrimethoxysilane methyltrimethoxysilane, methyltriethoxysilane and dimethyldimethoxysilane. The silane coupling agent is preferably methyltrimethoxysilane, dimethyldimethoxysilane, γ-glycidoxypropyltrimethoxysilane and γ-methacryloyloxypropyltrimethoxysilane, more preferably methyltrimethoxysilane and dimethyldimethoxysilane. Examples of commercial silane coupling agents are A-162, A-163 and AZ-6122 (each trade name, a product of NIPPON UNICAR CO., L.T.D.). The silane coupling agents may be utilized singly or as a combination of two or more members. When the dispersing component of the inorganic oxide sol is surface-treated with the silane coupling agent, the amount of the silane coupling agent is preferably 1 to 40 percent by weight, more preferably 5 to 30 percent by weight based on the nonvolatile matter of the inorganic oxide sol.

The dispersing component of the inorganic oxide sol surface-treated with the silane coupling agent is preferably a dispersing component of the inorganic oxide sol produced by dehydrating water containing in an aqueous inorganic oxide sol by azeotropic distillation with an azeotropic solvent to water and then surface-treating the dispersing component with the silane coupling agent. More preferably, the dispersing component of the inorganic oxide sol is a dispersing component of the silica sol. The dispersing component of the inorganic oxide sol produced by the method improves the stain resistance, stain-removing property and weathering resistance of the obtained paint film. Further, a coating composition having high nonvolatile matter can be easily obtained by preparing the coating composition because it is possible to increase the concentration of the inorganic oxide sol. Therefore, it is possible to select a thinner for controlling the viscosity of the coating composition from various thinners in broad selection width and to increase the thickness of the paint film in coating.

The azeotropic solvents include a water-soluble alcohol, a water-soluble carboxylic acid ester and a water-soluble cyclic ether. The water-soluble alcohols include ethanol, n-propylalcohol, i-propylalcohol, n-butylalcohol, i-butylalcohol, sec-butylalcohol, t-butylalcohol, methylcellosolve, ethylcellosolve, ethyleneglycolmonomethylether, ethyleneglycolmonoethylether, ethyleneglycolmono-n-propylether, ethyleneglycolmonobutylether, diethyleneglycolmonomethylether, diethyleneglycolmonoethylether, diethyleneglycolmonobutylether, 3-methyl-3-methoxybutanol propyleneglycolmonomethylether, ethyleneglycol and propyleneglycol.

The water-soluble carboxylic acid esters include methylacetate and ethylacetate. The water-soluble cyclic ethers include 1,4-dioxane.

The azeotropic solvents may be utilized singly or as a combination of two or more members.

A water-insoluble solvent also can be used together with a mediation of the water-soluble solvent in order to improve the efficiency of dehydration by azeotropic distillation. The water-insoluble solvents include benzene, xylene, toluene, cyclohexanone, diphenylether and dibutylether. The water-insoluble solvent may be utilized singly or as a combination of two or more members. The amount of the water-insoluble solvent is limited in the range in which the sol is not flocculated and generally preferably 1 to 10 percent by weight, though the amount is different according to the kind of the water-insoluble solvents.

The dehydration by azeotropic distillation is preferably proceeded with the dropping of azeotropic solvent. The dehydration by azeotropic distillation is proceeded in the range of preferably 30 to 100° C., more preferably 40 to 80° C. The dehydration by azeotropic distillation can be proceeded under reduced pressure or atmosphere, preferably under reduced pressure. The water content of the inorganic oxide sol dispersed in the azeotropic solvent after the dehydration by azeotropic distillation is generally preferably not more than 2 percent by weight, more preferably not more than 1 percent by weight. The concentration of the dispersing component of the inorganic oxide sol dispersed in the azeotropic solvent after dehydration by azeotropic distillation is preferably not more than 55 percent by weight, more preferably 25 to 55 percent by weight as nonvolatile content.

The surface-treatment with the silane coupling agent can be proceeded by mixing the silane coupling agent with the dispersing component of the inorganic oxide sol dispersed in the azeotropic solvent after the dehydration by azeotropic distillation. The temperature of surface-treatment with the silane coupling agent is particularly not limited, preferably 20 to 100° C., more preferably 30 to 90° C., furthermore 40 to 80° C.

The water content of the inorganic oxide sol dispersed in the azeotropic solvent after the surface-treatment with the silane coupling agent is generally preferably not more than 1 percent by weight, more preferably not more than 0.5 percent by weight.

The solvent of inorganic oxide sol dispersed in the azeotropic solvent can be substituted with the desired solvent according to the need. The solvents used in solvent substitution include an alcohol described above, acetone, methylethylketone, methylisobutylketone, cyclohexanone, dimethylacetoamide and dimethylformamide. The solvent substitution is proceeded in the range of preferably 30 to 120° C., more preferably 40 to 110° C., though it is influenced by the kind of the solvents.

In the coating composition of the present invention, the dispersing components of inorganic oxide sol may be utilized singly or as a combination of two or more members. The amount of the nonvolatile matter of the dispersing component of inorganic oxide sol is selected to be 5 to 60 percent by weight based on the total amount of nonvolatile matter of ingredient (A), ingredient (B) and ingredient (C). When the amount of the nonvolatile matter of the dispersing component of inorganic oxide sol is less than 5 percent by weight to the total amount of nonvolatile matter, the effect of addition of the dispersing component of inorganic oxide sol is not sufficiently obtained and the improvement effect of the stain resistance, stain-removing property and weathering resistance of the paint film is not sufficiently obtained. When the amount of the nonvolatile matter of the dispersing component of inorganic oxide sol is more than 60 percent by weight to the total amount of nonvolatile matter, the trend of the decrease in the flexibility of the paint film is observed. The amount of the nonvolatile matter of the dispersing component of inorganic oxide sol is preferably 5 to 40 percent by weight against the total amount of nonvolatile matter in view of the balance of stain resistance, stain-removing property, weathering resistance, and flexibility of the paint film.

The average particle diameter of the dispersing component of inorganic oxide sol is preferably not more than 100 nm, more preferably not more than 50 nm. When the average particle diameter is more than 100 nm, transparency of a clear film decreases and the stain resistance and removing property of the paint film decrease.

In the coating composition of the present invention, a curing reaction catalyst may be utilized. When the polyisocyanate compound having two or more isocyanate groups and/or blocked isocyanate groups in the molecule is used as ingredient (B) in the coating composition of the present invention, the curing reaction catalysts include a tin compound and a zinc compound. The tin compounds include tin halides such as tin chloride and tin bromide; organic tin compounds such as dibutyltindiacetate and dibutyltindilaurate. The zinc compounds include zinc halides such as zinc chloride and zinc bromide; organic acid zinc salts such as zinc octanoate and zinclaurate. The tin compound and the zinc compound of the curing reaction catalyst may be utilized singly or as a combination of two or more members and may be utilized together with other curing reaction catalysts. The preferable amount of the curing reaction catalyst is 0.01 to 5 percent by weight based on the total amount of nonvolatile matter in the coating composition. When the amount of the curing reaction catalyst is less than 0.01 percent by weight, the promoting effect of the curing reaction may be insufficiently exerted. When the amount of the curing reaction catalyst is more than 5 percent by weight, the water resistance and moisture resistance of the paint film may be decreased, and the decreases of the stain resistance, removing resistance and weathering resistance of the paint film may be caused. The more preferable amount of the curing reaction catalyst is 0.01 to 2 percent by weight based on the total amount of nonvolatile matter of the composition in view of the balance of the curing rate and the properties of the paint film.

In the coating composition of the present invention, when the aminoplast resin is used as ingredient (B), a curing reaction catalyst for the aminoplast resin may be utilized. The curing reaction catalysts for the aminoplast resin include phosphoric acid curing catalyst, sulfonic acid curing catalysts such as toluenesulfonic acid and dodecylbenzenesulfonic acid, and the amine-blocked compound thereof. The curing reaction catalysts may be utilized singly or as a combination of two or more members and may be utilized together with other curing reaction catalysts in order to control the curing time. The preferable addition amount of the curing reaction catalyst for the aminoplast resin is 0.01 to 2 percent by weight based on the total amount of nonvolatile matter of the coating composition. With respect to the reason, when the amount of the curing reaction catalyst is less than 0.01 percent by weight, the effect of the curing reaction catalyst for the aminoplast resin may be not manifested in curing of the coating composition. When the amount of the curing reaction catalyst is more than 2 percent by weight, the properties such as water resistance and moisture resistance of the paint film may become bad by the influence of the curing reaction catalyst after forming the paint film and the stain resistance, removing properties of stain and weathering resistance of the paint film may be decreased.

When an enamel is produced by compounding the proper pigments, dyes or flake pigments (brightener) in preparing the composition of the present invention, the obtained enamel does not lose the essential effect. Therefore, it is possible to give design properties such as the coloration of the substrate by compounding colored pigments other than a clear coating composition. It is also possible to control the properties of the paint film by compounding an extender pigment. These include colored pigments such as titanium oxide, carbon black, an organic pigment and red iron oxide; colorant such a as glass flake, aluminum flake and mica flake; fillers such as talc; and extender pigments such as strontium chlomate and barium sulfate.

When the coating composition of the present invention contains the pigment, the amount of the pigment is generally preferably 0.1 to 40 percent by weight, more preferably 0.5 to 35 percent by weight.

The preparation methods of the coating composition of the present invention are not particularly limited and includes that of the mixing essential components and required various additives in an arbitrary order and with other various methods. The preferable preparation method is the following method.

That is the preparation method which is proceeded by using a organic-inorganic composite obtained by copolymerizing 10 to 90 percent by weight of (a) a (meth) acrylic acid ester of an alkyl alcohol of 1 to 12 carbon atoms, 10 to 50 percent by weight of (b) a polymerizable double bond-containing and hydroxyl group-containing monomer, 0.1 to 10 percent by weight of (c) a polymerizable double bond-containing and carboxyl group-containing monomer, 0 to 20 percent by weight of (d) styrene, 0 to 20 percent by weight of (e) acrylonitrile and 0 to 10 percent by weight of (f) other polymerizable double bond-containing monomer to produce a resin (A) having a glass transition temperature of 50 to 120° C., a number average molecular weight of 2,000 to 100,000, a hydroxyl value of 50 to 150 mgKOH/g and an acid value of 1 to 25 mgKOH/g, and adding at least one (C) dispersing component of an inorganic oxide sol selected from the group consisting of an aluminum oxide sol, a silica sol, a zirconium oxide sol and an antimony oxide sol into a polymerization liquid to be 5 to 60 percent by weight as a nonvolatile matter of ingredient (C) based on a total amount of nonvolatile matter of ingredient (A), ingredient (B) and ingredient (C) after finishing of the copolymerization of the resin (A), or by mixing and stabilizing ingredient (C) in the monomers and by copolymerizing the monomers. Particularly, after finishing of the copolymerization to obtain the resin of ingredient (A), the dispersing component of the inorganic oxide sol of ingredient (C) is preferable to be added into the polymerization liquid under heating or without heating and to be stabilized in dispersion state.

The addition of a diluent is generally conducted to control the concentration of the resin liquid after the preparation of the resin of ingredient (A) by polymerization. The addition of the dispersing component of the inorganic oxide sol of ingredient (C) is replaced to the addition of the diluent.

By adding the dispersing component of the inorganic oxide sol into the polymerization liquid after finishing of the copolymerization of the resin of ingredient (A), it is difficult to cause the aggregation of the dispersing component of the inorganic oxide sol. And, in the case of the further addition of the dispersing component of the inorganic oxide sol at later stages, it is difficult to cause the aggregation of the dispersing component of the inorganic oxide sol. In the application of the coating composition, the operation efficiency of electrostatic coating, transfer efficiency of coating, atomization of particulate and appearance of the paint film are extremely improved. Therefore,the operation efficiency in coating process line is extremely improved and the appearance of the obtained paint film is very superior. Further, when the concentration of the organic-inorganic composite solution, in which the ingredient (C) is dispersed and stabilized, is increased, rise of viscosity is comparably low and high solid coating composition can be easily obtained. The coating composition of the present invention is preferable as a coating composition capable to decrease environmental pollution.

As described above, the preferable addition of the dispersing component of the inorganic oxide sol of ingredient (C) is conducted after finishing of the copolymerization of the resin of ingredient (A). The term "after finishing of the copolymerization" means "after preparation of the resin of ingredient (A) having a glass transition temperature of 50 to 120° C., a number average molecular weight of 2,000 to 100,000, a hydroxyl value of 50 to 150 mgKOH/g and an acid value of 1 to 25 mgKOH/g". The polymerization liquid may contain unreacted monomers.

The addition of the dispersing component of the inorganic oxide sol of ingredient (C) is preferably conducted at the temperature of not more than the boiling point of the dispersion medium of the inorganic oxide sol of ingredient (C), more preferably conducted at the temperature of 10 to 50° C. lower than the boiling point of the medium of the inorganic oxide sol of ingredient (C). The polymerization liquid before the addition of the dispersing component (C) contains preferably 40 to 80 percent by weight, more preferably 50 to 70 percent by weight of the resin material.

In the case of the clear coating composition, preferable preparation methods of the coating composition include a preparation method comprising mixing and stabilizing the dispersing component of the inorganic oxide sol of ingredient (C) in the solvents of polymerization and then copolymerizing the monomers to produce the resin of ingredient (A) in the same condition described above and uniformly mixing the resin (A) according to the need, the curing agent of ingredient (B) and required various additives, and a preparation method comprising copolymerizing the monomers to produce the resin of ingredient (A) and then adding and stabilizing the dispersing component of the inorganic oxide sol in the polymerization liquid under heating or without heating to produce the organic-inorganic composite solution, in which the inorganic oxide sol is dispersed and stabilized, and uniformly mixing the resin (A) according to the need, the curing agent of ingredient (B) and required various additives.

In the case of the enamel coating composition, the coating composition of this invention can be prepared by dispersing the desired pigment together with the resin of ingredient (A) and/or a dispersant and the like by a dispersing machine and compounding it in the clear coating composition described above. The various additives used according to the need include colorants such as a dye, a glass flake, an aluminum flake and mica flake, a filler, a solvent, a pigment dispersant, a flow controlling agent, a leveling agent, an antigelling agent, an antioxidant, an ultraviolet absorber, an ultraviolet stabilizer and a radical scavenger.

The curing temperature and time required to curing such coating compositions of the present invention are influenced with the kind of the ingredients and the reaction catalysts, the curing temperature is generally a room temperature to 220° C. and the curing time is generally 30 seconds to 10 hours.

The coating compositions of the present invention can be utilized in a single layer paint film or in multi layers paint film.

The multi layers paint films include that prepared by the coating method comprising applying a colored film forming composition on a substrate to form a base coat film and then applying a clear coat film forming composition of the this coating composition on the base coat film to form a clear top coat film.

The colored film forming composition of the base coat film comprises a resin binder and a pigment. The resin binders include various binders such as a conventional acrylic resin, a polyester resin (containing an alkyd resin), a polyurethane resin and melamine resin.

The colored film forming composition of the base coat film can comprise at least one of conventional various additives such as a surface active agent, a leveling agent, a thixotropic agent, a filler, a defoaming agent, an organic solvent and a catalyst.

The amount of the pigment is preferably 1 to 80 percent by weight, more preferably 3 to 60 percent by weight in the colored film forming composition.

The pigments include various pigments of organic pigments and inorganic pigments. Examples of the pigments include surface treated metallic pigments such as aluminum, copper, brass, bronze, stainless steel, iron oxides of mica form, metallic powders of flake form and mica coated with titanium dioxide or iron oxides; inorganic pigments such as titanium dioxide, iron oxides, yellow iron oxide and carbon black; organic pigments such as phthalocyanine blue, phthalocyanine green and quinacridone red pigments; extender pigments such as precipitated barium sulfate, clay, silica and talc.

The method of applying the coating composition to form the multi layers paint film includes a method which comprises heating the colored film forming composition of the base coat film or controlling the viscosity by adding organic solvents or reactive diluents according to the needs, and applying the colored film forming composition on the substrate by conventional coating machines such as air spray, electrostatic air spray, roll coater, flow coater, dip type coating machine and the like, brush, bar coater or applicator in an amount to form a film having dried thickness of 0.5 to 300 μm and curing, in general, in the condition of 50 to 300° C. for 5 seconds to 24 hours, followed applying the clear forming composition of the clear coat film on the base coat by the above method in an amount to form a film having dried thickness of 10 to 100 μm, preferable 10 to 60 μm and curing, in general, in the condition of 50 to 300° C. for 5 seconds to 24 hours and the like and a method which comprises, in the case of two coat one bake coating, diluting the colored film forming composition with suitable solvents such as organic solvents to control the desirable viscosity, applying the base coat composition on the substrate by the above method in an amount to form a film having dried thickness of 5 to 40 μm, preferable 7 to 35 μm, allowing to stand at room temperature to 100° C. for 1 to 20 minutes, followed applying the clear forming composition of the clear coat film on the base coat by the above method in an amount to form a film having dried thickness of 10 to 100 μm, preferable 10 to 60 μm and curing, in general, in the condition of 50 to 300° C. for 5 seconds to 24 hours and the like. Preferable method of the application is the application by an air spray in the above methods.

Other multi layers paint film includes that produced by a method which comprises applying a colored base coating composition on the substrate, followed by applying a clear coating composition on the uncured colored base coat and curing the coats, and then by applying an over clear coating composition on the clear coat and curing, wherein the clear coating composition is an acrylic resin-aminoplast resin coating composition and the over clear coating composition is the coating composition of this invention. The colored base coating composition is similar to that described in the above multi layers paint film.

The acrylic resin-aminoplast resin coating composition can be used as the clear coating composition applied on the uncured colored base coat. The acrylic resins include a resin produced by copolymerizing (a) a (meth) acrylic acid ester of an alkyl alcohol of 1 to 12 carbon atoms, (b) a polymerizable double bond-containing and hydroxyl group-containing monomer and (c) a polymerizable double bond-containing and carboxyl group-containing monomer, and optionally (d) styrene, (e) acrylonitrile and (f) other polymerizable double bond-containing monomer and the like. The preferable aminoplast resins include a melamine resin and a guanamine resin. The aminoplast resin may be utilized singly or in a combination of two or more members. The aminoplast resin has two or more reactive groups in the molecule and is not particularly limited. The triazin ring may be one or more in a molecule of the melamine resin and the guanamine resin. The preferable reactive group in the resins includes methylol group, imino group and groups etherificated with methanol or butanol. The compound ratio of the acrylic resin and the aminoplast resin in the acrylic resin-aminoplast resin coating composition is not particularly limited and preferably 90:10 to 50:50, more preferably 80:20 to 60:40 in parts by weight.

A curing reaction catalyst for the aminoplast resin can be formulated in the acrylic resin-aminoplast resin coating composition. Preferable examples of the curing reaction catalysts for the aminoplast resin are, for example, a phosphoric acid curing catalyst, sulfonic acid curing agents such as toluenesulfonic acid and dodecylbenzenesulfonic acid and an amine blocked compound thereof. The curing reaction catalysts can be utilized singly or in combination of two or more members and may be utilized together with other compounds in order to control the curing time. The additional amount of curing reaction catalyst is preferably 0.01 to 2 percent by weight based on the total amount of nonvolatile matter in the acrylic resin-aminoplast resin coating composition.

The clear coating composition in the method of preparing the multi layers paint film can comprise additives such as a flow controlling agent, a leveling agent, an antigelling agent, an antioxidant, an ultraviolet absorber, an ultraviolet stabilizer and a radical scavenger, according to the needs.

The preferable methods of preparing the multi layers paint film include a method which comprises controlling the viscosity by heating the colored film forming composition of the base coat film or adding organic solvents or reactive diluents according to the needs, and applying the colored film forming composition on the substrate by conventional coating machines such as air spray, electrostatic air spray, roll coater, flow coater, dip type coating machine and the like, brush, bar coater or applicator in the amount to form a film having dried thickness of 5 to 40 μm, preferably 7 to 35 μm and allowing to stand, in general, in the condition of a room temperature to 100° C. for 1 to 20 minutes, followed applying the clear coating composition on the base coat by the above method in the amount to form a film having dried thickness of 10 to 100 μm, preferable 10 to 60 μm and curing, in general, in the condition of 50 to 300° C. for 5 seconds to 24 hours and the like and then applying the over clear coating composition on the clear coat by the above method in the amount to form a film having dried thickness of 5 to 50 μm, preferable 5 to 20 μm and then curing, in general, in the condition of 50 to 300° C. for 5 seconds to 24 hours.

The kind of the substrate to which the coating is applied is not particularly limited, but various kinds of organic or inorganic substrate materials, such as woods, glasses, metals, fabrics, plastics, foamed articles, elastomers, papers, ceramics, concretes and gypsum boards, may be utilized. The substrates may be treated on the surface and coated with one or more coating compositions.

Coated articles prepared by the coating composition of the present invention include buildings, structures, wood articles, metallic articles, plastics articles, rubber articles, finished papers, ceramic articles and glass articles, specifically automobiles, parts for automobiles (for example, body, bumper, spoiler, mirror, wheel such as aluminum wheel and inner package material, and these parts are made of various materials), metal plates such as steel plates, two-wheel barrows, parts for two-wheel barrows, materials for road (for example, steel rail and traffic control sign), materials for tunnel (for example, sidewall plate), marine vessels, railway vehicles, airplanes, printing machines, parts for printing machines, furnitures, musical instruments, house-hold electric instruments, building materials, vessels, office articles, sport articles and toys.

The coating composition of the invention can be utilized in an ink, an adhesive agent and a mold except for the coating composition.

EXAMPLES

The invention is explained in detail with reference to the following examples; however, these examples are intended to illustrate the invention and are not to be construed to limit the scope of the invention.

Preparation of the test panels and evaluation of the properties of the cured film were conducted as follows.

(1) Preparation of a Clear Coat Test Panel

An epoxy resin coating composition for baking (EPICO PRIMER No.1000 BF2, a product of NOF CORPORATION) was applied on a cold-finished steel plate (JIS G-3141) in the amount to form a film having dried thickness of 20 μm and the steel plate was baked in the condition of 160° C. for 20 minutes. And the mixture of an urethane resin coating composition, HIGHURETHANE No.5000 (white) (a registered trade mark and a product of NOF CORPORATION) and a curing agent, HIGHURETHANE CURING AGENT HA (a registered trade mark and a product of NOF CORPORATION) in ratio of 6:1 in parts by weight was applied on the primer coat in the amount to form a film having dried thickness of 25 μm, and the steel plate was dried in forced dried condition of 80 ° C. for 30 minutes and then was allowed to place in a night to prepare the test panel.

(2) Preparation of a Enamel Coat Test Panel

An epoxy resin coating composition for baking (EPICO PRIMER No.1000 BF2, a product of NOF CORPORATION) was applied on a cold-finished steel plate in the amount to form a film having dried thickness of 20 μm and the steel plate was baked in the condition of 160° C. for 20 minutes to prepare the test panel.

(3) Evaluation of Properties of Cured Films (a) 60 Degree Specular Gloss

The 60 degree specular gloss (Gs 60°) of the cured film was measured according to Japanese Industrial Standard K-5400 (1990) 7.6.

(b) Distinctness of Image

The distinctness of image of the cured film was evaluated by visual observation according to the following standard.

◯: When a fluorescent lamp was projected on the cured film, the fluorescent lamp was vividly observed.

Δ: When a fluorescent lamp was projected on the cured film, the outline of the fluorescent lamp was dimly observed.

X: When a fluorescent lamp was projected on the cured film, the fluorescent lamp was remarkable dimly observed.

(c) Accelerated Weathering Resistance Test

By using a weathering resistance tester of sunshine carbon arc lamp (Japanese Industrial Standard D-0205 5.4), a test piece was exposed and a retention of the 60 degree specular gloss (Japanese Industrial Standard K-5400 (1990) 7.6) of the cured film was measured.

(d) Moisture Resistance

The test piece was ex posed under the condition of 40±1° C. and relative humidity of 95 or more % for 240 hours and then was taken out. The surface condition of the test piece was observed by visual after 2 hours from taking out time and was evaluated according to the following standard.

◯: The change of the gloss and the surface condition of the test piece was not observed compared with an original test piece.

Δ: The change of the gloss and blistering of the test piece was observed in small portions compared with an original test piece.

X: The change of the gloss and blistering of the test piece was remarkably observed compared with an original test piece.

(e) Xylene Rubbing Resistance

On a test piece, a flannel soaked with xylene was rubbed by reciprocating 100 times. The surface condition of the test piece was observed by visual and was evaluated in the following standard.

◯: The change of the gloss and the surface condition of the test piece was not observed compared with an original test piece.

Δ: The change of the gloss of the test piece was observed in small portions compared with an original test piece.

X: The change of the gloss of the test piece was remarkably observed compared with an original test piece.

(f) Acid Resistance

The acid resistance test was conducted according to Japanese Industrial Standard K-5400 (1990) 8.22 and the acid resistance was evaluated in the following standard.

◯: The change of the gloss and the discoloration of the test piece was not observed compared with an original test piece.

Δ: The change of the gloss and the discoloration of the test piece was observed in small portions compared with an original test piece.

X: The change of the gloss and the discoloration of the test piece was remarkably observed compared with an original test piece.

(g) Alkali Resistance

The alkali resistance test was conducted according to Japanese Industrial Standard K-5400 (1990) 8.21 and the alkali resistance was evaluated in the following standard.

◯: The change of the gloss and the discoloration of the test piece was not observed compared with an original test piece.

Δ: The change of the gloss and the discoloration of the test piece was observed in small portions compared with an original test piece.

X: The change of the gloss and the discoloration of the test piece was remarkably observed compared with an original test piece.

(h) Oil Ink Stain Resistance

On the test piece, a line of oil ink was drawn and the test piece was heat at 80° C. for 5 hours. And the line of oil ink was wiped with a flannel soaked with xylene. The surface condition of the test piece was observed by visual and was evaluated in the following standard.

◯: The line of oil ink was completely wiped and there was not the trace left behind.

Δ: The trace of the line was observed in small portions.

X: The trace of the line was clearly observed.

(i) Pencil Hardness

The pencil hardness was measured according to Japanese Industrial Standard K-5400 (1990) 8.4.2.

(j) Adhesive Property

By the adhesive property test according to Japanese Industrial Standard K-5400 (1990) 8.5.1, the adhesive property was evaluated in the following standard.

◯: 10 point

Δ: 8 point

X: not more than 6 point (k) Appearance of a Thick Cured Film

The cured film was prepared to form a film having dried thickness of 60 μm. The surface condition was observed by visual and evaluated in the following standard.

◯: good

Δ: There were pop marks on a part of the surface of the film.

X: There were pop marks on all surface of the film.

(l) Stain Property in Atmospheric Exposure

The atmospheric exposure test of test piece was conducted for 3 months and stain property was evaluated by a difference (ΔL) which is calculated by subtract L value after the atmospheric exposure from initial L value before the atmospheric exposure, measured by SM color computer SM-4-MCH (a product of SUGA TEST MACHINE CO. LTD.).

(4) Workability (m) Atomization

The condition of the atomization at applying was observed and was evaluated in the following standard.

⊚: very good
○: good
Δ: bad in a part of atomization
X: bad in overall atomization (n) Transfer Efficiency Transfer efficiency means an transfer efficiency of the atomized coating composition on the substrate. The transfer efficiency was evaluated in the following standard by observing the extensive state of the coating composition mists and the transfer rate of the mists on the substrate at applying overall.

⊚: very good
○: good
Δ: bad in a part of the substrate
X: bad in overall the substrate (o) Stain after Removing Stains On the surface of the exposed test piece, a gauze soaked with ion-exchange water was rubbed by reciprocating 10 times, and the gauze was exchanged, and then a new gauze soaked with ion-exchange water was rubbed by reciprocating 10 times to remove stains. Further, water on the test piece was wiped up by a dried gauze. Stain property of the cured film was evaluated by a difference (ΔL) which is calculated by subtract L value after the atmospheric exposure from initial L value before the atmospheric exposure, measured by the color computer

PREPARATION EXAMPLE 1

Into a reaction vessel equipped with a stirrer, a thermometer, a reflux condenser and a dropping funnel, 50 parts by weight of xylene and 50 parts by weight of isobutyl-acetate were charged and the mixture was heated to keep at the temperature of 110° C.

To the mixture kept at 110° C., a mixture of 61 parts by weight of methyl-methacrylate, 19 parts by weight of butyl-acrylate, 19 parts by weight of 2-hydroxyethyl-methacrylate, 1 part by weight of methacrylic acid and 2 parts by weight of 2,2'-azobis (2-methylbutyronitrile) was added by dropping for 2 hours. After the completion of dropping, the mixture was kept stirring at 110° C. for 1 hour and a mixture of 0.2 parts by weight of 2,2'-azobis (2-methylbutyronitrile) and 2 parts by weight of isobutyl-acetate was added and the mixture was kept stirring for further 1 hour. After completion of polymerization, a resin solution containing 50.2 percent by weight of non-volatile material was obtained.

The obtained resin had a glass transition temperature of 50° C., a number average molecular weight of 4,800, a hydroxyl value of 80 mgKOH/g and an acid value of 7 mgKOH/g.

Preparation Examples 2 to 14

By using solvents, monomers and polymerization initiators in kind and the amount shown in Tables 1 to 4, resin solutions were prepared in the same method as described in Preparation example 1.

The properties of the obtained resins were shown in Tables 1 to 4.

TABLE 1

| Preperation Example | | 1 | 2 | 3 | 4 |
|---|---|---|---|---|---|
| initial (parts by weight) | xylene | 50 | 50 | 50 | 50 |
| | isobutyl-acetate | 50 | 50 | 50 | 50 |
| dropping (parts by weight) | methyl-methacrylate | 61 | 70 | 78 | 80 |
| | butyl-acrylate | 19 | 10 | 2 | — |
| | cyclohexyl-methacrylate | — | — | — | — |
| | isobornyl-methacryalte | — | — | — | — |
| | 2-hydroxyethyl-methacrylate | 19 | 19 | 19 | 19 |
| | FM-2 | — | — | — | — |
| | methacrylic acid | 1 | 1 | 1 | 1 |
| | styrene | — | — | — | — |
| | acrylonitrile | — | — | — | — |
| | ABMBN | 2 | 2 | 2 | 2 |
| additional (parts by weight) | ABMBN | 0.2 | 0.2 | 0.2 | 0.2 |
| | isobutyl-acetate | 2 | 2 | 2 | 2 |
| total (parts by weight) | | 204.2 | 204.2 | 204.2 | 204.2 |
| non-volatile matter concentration (weight %) | | 50.2 | 50.1 | 50.0 | 50.2 |
| resin properties | glass transition temperature (° C.) | 50 | 70 | 90 | 95 |
| | number average molecular weight | 4800 | 4800 | 4700 | 4800 |
| | hydroxyl value (mgKOH/g) | 80 | 80 | 80 | 80 |
| | acid value (mgKOH/g) | 7 | 7 | 7 | 7 | notes
FM-2: ε-caprolactone-modified hydroxymethacrylate (trade name, a product of Daicel Chemical Industries, Ltd.)
ABMBN: 2,2'-azobis (2-methylbutyronitrile)

TABLE 2

| Preparation Example | | 5 | 6 | 7 | 8 |
|---|---|---|---|---|---|
| initial (parts by weight) | xylene | 50 | 50 | 50 | 50 |
| | isobutyl-acetate | 50 | 50 | 50 | 50 |
| dropping (parts by weight) | methyl-methacrylate | 75 | 63 | 71 | 67 |
| | butyl-acrylate | 12 | 8 | 10 | 11 |
| | cyclohexyl-methacrylate | — | — | — | — |
| | isobornyl-methacryalte | — | — | — | — |
| | 2-hydroxyethyl-methacrylate | 12 | 28 | 18.7 | 18.9 |
| | FM-2 | — | — | — | — |
| | methacrylic acid | 1 | 1 | 0.3 | 3.1 |
| | styrene | — | — | — | — |
| | acrylonitrile | — | — | — | — |
| | ABMBN | 2 | 2 | 2 | 2 |
| additional (parts by weight) | ABMBN | 0.2 | 0.2 | 0.2 | 0.2 |
| | isobutyl-acetate | 2 | 2 | 2 | 2 |
| total (parts by weight) | | 204.2 | 204.2 | 204.2 | 204.2 |
| non-volatile matter concentration (weight %) | | 50.3 | 50.0 | 50.2 | 50.1 |
| resin properties | glass transition temperature (° C.) | 70 | 70 | 70 | 70 |
| | number average molecular weight | 5000 | 4700 | 4900 | 4800 |
| | hydroxyl value (mgKOH/g) | 50 | 120 | 80 | 80 |
| | acid value (mgKOH/g) | 7 | 7 | 2 | 20 |

TABLE 3

| Preparation Example | | 9 | 10 | 11 | 12 |
|---|---|---|---|---|---|
| initial (parts by weight) | xylene | 50 | 50 | 50 | 50 |
| | isobutyl-acetate | 50 | 50 | 50 | 50 |
| dropping (parts by weight) | methyl-methacrylate | 70 | 21 | 42 | — |
| | butyl-acrylate | 10 | 6 | 6 | — |
| | cyclohexyl-methacrylate | — | 51 | 30 | — |
| | isobornyl-methacryalte | — | — | — | 80 |
| | 2-hydroxyethyl-methacrylate | 19 | 21 | 21 | 19 |
| | FM-2 | — | — | — | — |
| | methacrylic acid | 1 | 1 | 1 | 1 |
| | styrene | — | — | — | — |
| | acrylonitrile | — | — | — | — |
| | ABMBN | 1 | 2 | 2 | 2 |
| additional (parts by weight) | ABMBN | 0.2 | 0.2 | 0.2 | 0.2 |
| | isobutyl-acetate | 2 | 2 | 2 | 2 |
| total (parts by weight) | | 203.2 | 204.2 | 204.2 | 204.2 |
| non-volatile matter concentration (weight %) | | 50.2 | 50.2 | 50.2 | 50.1 |
| resin properties | glass transition temperature (° C.) | 70 | 70 | 73 | 99 |
| | number average molecular weight | 12000 | 4900 | 5000 | 4600 |
| | hydroxyl value (mgKOH/g) | 80 | 90 | 90 | 80 |
| | acid value (mgKOH/g) | 7 | 6 | 6 | 7 |

TABLE 4

| Preparation example | | 13 | 14 |
|---|---|---|---|
| initial (parts by weight) | xylene | 50 | 50 |
| | isobutyl-acetate | 50 | 50 |
| dropping (parts by weight) | methyl-methacrylate | 34 | 20 |
| | butyl-acrylate | — | — |
| | cyclohexyl-methacrylate | 35 | 15 |
| | isobornyl-methacryalte | — | — |
| | 2-hydroxyethyl-methacrylate | 10 | 10 |
| | FM-2 | 20 | 20 |
| | methacrylic acid | 1 | 1 |
| | styrene | — | 17 |
| | acrylonitrile | — | 17 |
| | ABMBN | 2 | 2 |
| additional (parts by weight) | ABMBN | 0.2 | 0.2 |
| | isobutyl-acetate | 2 | 2 |
| total (parts by weight) | | 204.2 | 204.2 |
| non-volatile matter concentration (weight %) | | 50.2 | 50.2 |
| resin properties | glass transition temperature (° C.) | 58 | 59 |
| | number average molecular weight | 5000 | 4900 |
| | hydroxyl value (mgKOH/g) | 74 | 74 |
| | acid value (mgKOH/g) | 7 | 7 |

Preparation Example 15

Into a reaction vessel equipped with a stirrer, a thermometer, a reflux condenser having a Dean-Stark trap and a dropping funnel, 1000 parts by weight of SNOWTEX MIBK-ST (a product of Nissan Chemical Industries, Ltd., a dispersing component of silica sol (average particle diameter:30 nm), non-volatile material:30 percent by weight, solvent: methylisobutylketone) and 40 parts by weight of A-163 (a product of Nippon Unicar Co., Ltd., a silane coupling agent) were charged and the mixture was heated and kept at 80° C. for 8 hours. The resultant silica sol surface-treated with a silane coupling agent was obtained in 1020 parts by weight. The average particle diameter of the dispersing component of silica sol is 32 nm.

Preparation Example 16

By using solvents, monomers and polymerization initiators in kind and amount shown in Tables 5, resin solutions were prepared in the same method as described in Preparation Example 1.

The properties of the obtained resins were shown in Tables 5.

TABLE 5

| Preparation Example | | 16 |
|---|---|---|
| initial (parts by weight) | xylene | 50 |
| | isobutyl-acetate | 50 |
| dropping (parts by weight) | methyl-methacrylate | 66 |
| | butyl-acrylate | 13 |
| | 2-hydroxyethylmethacrylate | 19 |
| | trimethoxysilylpropyl-methacrylate | 1 |
| | methacrylic acid | 1 |
| | ABMBN | 2 |
| additional (parts by weight) | ABMBN | 0.2 |
| | isobutyl-acetate | 2 |
| total (parts by weight) | | 204.2 |
| non-volatile matter concentration (weight %) | | 50.2 |
| resin properties | glass transition temperature (° C.) | 65 |
| | number average molecular weight | 5000 |
| | hydroxyl value (mgKOH/g) | 80 |
| | acid value (mgKOH/g) | 7 |

Example 1

By mixing 45.0 parts by weight of the resin solution obtained in Preparation Example 1, 4.5 parts by weight of cyclohexanone, 41.2 parts by weight of the surface-treated silica sol obtained in Preparation Example 15, 0.8 parts by weight of TINUVIN 900 (a product of Ciba-Geigy Co., an ultraviolet absorber), 0.2 parts by weight of TINUVIN 292 (a product of Ciba-Geigy Co., an hinderedamine antioxidant), 1.0 parts by weight of BYK-358 (a product of BYK Chemie, a leveling agent), 1.0 parts by weight of 1 percent by weight solution of SCAT-8 (a product of Sankyo Organic Synthesis Co. Ltd., a tin curing catalyst) and 6.3 parts by weight of DURANATE THA-100 (a product of Asahi Chemical Industry Co., Ltd., a polymer of hexamethylenediisocyanate) under stirring, a coating composition was prepared.

And, the coating composition was diluted by a solvent mixture of SOLVESSO #100® (a product of Esso Co.) and cyclohexanone (in ratio by weight: 50:50) to the viscosity of 15 seconds at 20° C. by Ford cup No.4 and the diluted coating composition was applied on the clear coat test panel by air spraying (atomization pressure: 5 kg/cm$^2$) in the amount to form a film having dried thickness of 30 μm. The coated clear coat test panel was dried by forced drying at 80° C. for 30 minutes. After being placed for 3 days at room temperature, the cured film properties were evaluated.

The compounding rates of each ingredients in the coating composition and baking conditions were shown in Table 6 and the cured film properties were shown in Table 9.

Examples 2 through 15

After coating compositions were prepared in compounding rate shown in Tables 6 to 8 in the same method as described in Example 1, cured films were formed on test panels. Baking conditions and forced drying conditions at forming cured films were shown in Tables 6 to 8 and the cured film properties were shown in Tables 9 to 11.

Example 16

By mixing and dispersing 52.5 parts by weight of titanium oxide (DUPONT TITANIUM R-960, a product of Dupont Co.), 35.0 parts by weight of the resin solution obtained in Preparation Example 1 and 12.5 parts by weight of cyclohexanone in a motor mill (a product of Eiger Japan Co.) at 3,000 rpm for 40 minutes, a pigment-dispersed coating composition solution was prepared.

And, 46.9 parts by weight of the pigment-dispersed coating composition solution, 22.0 parts by weight of the resin solution obtained in Preparation Example 1, 3.0 parts by weight of cyclohexanone, 20.5 parts by weight of the surface-treated silica sol obtained in Preparation Example 15, 0.2 parts by weight of TINUVIN 292, 1.0 parts by weight of BYK-358, 1.0 parts by weight of 1 percent by weight solution of SCAT-8 and 5.4 parts by weight of DURANATE THA-100 were mixed under stirring and a coating composition was prepared.

Further, the coating composition was diluted by a solvent mixture of SOLVESSO #100® (a product of Esso Co.) and cyclohexanone (in ratio by weight: 50:50) to the viscosity of 15 seconds at 20° C. by Ford cup No.4 and the diluted coating composition was applied on the test panel by air spraying (atomization pressure: 5 kg/cm$^2$) in the amount to form a film having dried thickness of 30 μm. The test panel was dried by forced drying at 80° C. for 30 minutes. Furthermore, after being placed for 3 days at room temperature, the cured film properties were evaluated.

The cured film properties were shown in Table 12.

TABLE 6

| Example | | | 1 | 2 | 3 | 4 | 5 |
|---|---|---|---|---|---|---|---|
| compounding rate (parts by weight) | resin solution | kind (Preparation Example) | Prep. Ex. 1 | Prep. Ex. 2 | Prep. Ex. 3 | Prep. Ex. 4 | Prep. Ex. 5 |
| | | formulation weight | 45.0 | 45.0 | 49.6 | 46.9 | 45.8 |
| | silica sol | untreated silica sol | — | 41.2 | — | — | — |
| | | Preparation Ex. 15 | 41.2 | — | 29.0 | 15.7 | 40.9 |
| | curing agent | DURANATE THA-100 | 6.3 | 6.3 | — | — | 5.7 |
| | | DURANATE 24A-100 | — | — | — | 9.9 | — |
| | | DISMODUR BL-3175 | — | — | 13.4 | — | — |
| | solvent | cyclohexanone | 4.5 | 4.5 | 5.0 | 6.5 | 4.6 |
| | additive | TINUVIN 900 | 0.8 | 0.8 | 0.8 | 0.8 | 0.8 |
| | | TINUVIN 292 | 0.2 | 0.2 | 0.2 | 0.2 | 0.2 |
| | | BYK-358 | 1.0 | 1.0 | 1.0 | 1.0 | 1.0 |
| | curing catalyst | SCAT-8 (10% by weight solution) | — | — | 1.0 | — | — |
| | | SCAT-8 (1% by weight solution) | 1.0 | 1.0 | — | 1.0 | 1.0 |
| | | total | 100.0 | 100.0 | 100.0 | 100.0 | 100.0 |
| NCO/OH (mole ratio) | | | 1.0 | 1.0 | 1.0 | 1.0 | 1.4 |
| silica sol non-volatile matter/total non-volatile matter (percent by weight) | | | 30.0 | 30.0 | 20.0 | 10.0 | 30.0 |
| baking or forced drying condition | | temperature (° C.) | 80 | 80 | 150 | 80 | 80 |
| | | time (minutes) | 30 | 30 | 20 | 30 | 30 | notes
DURANATE 24A-100: a product of Asahi Chemical Industries Co. Ltd., a polymer of hexamthylenediisocyanate

TABLE 7

| Example | | | 6 | 7 | 8 | 9 | 10 |
|---|---|---|---|---|---|---|---|
| compounding rate (parts by weight) | resin solution | kind (Preparation Example) | Prep. Ex. 6 | Prep. Ex. 7 | Prep. Ex. 8 | Prep. Ex. 9 | Prep. Ex. 10 |
| | | formulation weight | 52.0 | 54.6 | 54.6 | 69.8 | 47.2 |
| | silica sol | untreated silica sol | — | — | — | — | — |
| | | Preparation Ex. 15 | 29.9 | 29.9 | 29.9 | 14.9 | 29.5 |
| | curing agent | DURANATE THA-100 | — | 7.7 | 7.7 | — | — |
| | | DURANATE 24A-100 | 9.9 | — | — | 5.3 | — |
| | | DISMODUR BL-3175 | — | — | — | — | 15.7 |
| | solvent | cyclohexanone | 5.2 | 5.5 | 5.5 | 7.0 | 4.7 |
| | additive | TINUVIN 900 | 0.8 | 0.8 | 0.8 | 0.8 | 0.8 |
| | | TINUVIN 292 | 0.2 | 0.2 | 0.2 | 0.2 | 0.1 |
| | | BYK-358 | 1.0 | 1.0 | 1.0 | 1.0 | 1.0 |
| | curing catalyst | SCAT-8 (10% by weight solution) | — | — | — | — | 1.0 |
| | | SCAT-8 (1% by weight solution) | 1.0 | 1.0 | 1.0 | 1.0 | — |
| | | total | 100.0 | 100.0 | 100.0 | 100.0 | 100.0 |
| NCO/OH (mole ratio) | | | 0.8 | 1.0 | 1.0 | 0.6 | 1.1 |
| silica sol non-volatile matter/total non-volatile matter (percent by weight) | | | 20.0 | 20.0 | 20.0 | 10.0 | 20.0 |
| baking or forced drying condition | | temperature (° C.) | 80 | 80 | 80 | 80 | 150 |
| | | time (minutes) | 30 | 30 | 30 | 30 | 20 |

TABLE 8

| Example | | | 11 | 12 | 13 | 14 | 15 |
|---|---|---|---|---|---|---|---|
| compounding rate (parts by | resin solution | kind (Preparation Example) | Prep. Ex. 11 | Prep. Ex. 12 | Prep. Ex. 13 | Prep. Ex. 14 | Prep. Ex. 11 |
| | | formulation weight | 53.6 | 62.0 | 36.4 | 21.8 | 53.6 |

TABLE 8-continued

| Example | | | 11 | 12 | 13 | 14 | 15 |
|---|---|---|---|---|---|---|---|
| weight) | silica sol | untreated silica sol | — | — | — | — | — |
| | | Preparation Ex. 15 | 29.5 | 16.2 | 51.9 | 69.9 | 29.5 |
| | curing agent | DURANATE THA-100 | 8.5 | — | — | — | — |
| | | DURANATE 24A-100 | — | 12.6 | 5.1 | 3.1 | — |
| | | DISMODUR BL-3175 | — | — | — | — | — |
| | solvent | cyclohexanone | 5.4 | 6.2 | 3.6 | 2.2 | 6.4 |
| | additive | TINUVIN 900 | 0.8 | 0.8 | 0.8 | 0.8 | 0.8 |
| | | TINUVIN 292 | 0.2 | 0.2 | 0.2 | 0.2 | 0.1 |
| | | BYK-358 | 1.0 | 1.0 | 1.0 | 1.0 | 1.0 |
| | curing catalyst | SCAT-8 (10% by weight solution) | — | — | — | — | — |
| | | SCAT-8 (1% by weight solution) | 1.0 | 1.0 | 1.0 | 1.0 | — |
| | total | | 100.0 | 100.0 | 100.0 | 100.0 | 100.0 |
| NCO/OH (mole ratio) | | | 1.1 | 1.6 | 1.2 | 1.2 | 1.1 |
| silica sol non-volatile matter/total non-volatile matter (percent by weight) | | | 20.0 | 10.0 | 40.0 | 60.0 | 20.0 |
| baking or forced drying condition | temperature (° C.) | | 80 | 80 | 80 | 80 | 120 |
| | time (minutes) | | 30 | 30 | 30 | 30 | 30 |

TABLE 9

| Example | | | 1 | 2 | 3 | 4 | 5 |
|---|---|---|---|---|---|---|---|
| operation efficiency in coating process | atomization | | ○ | ○ | ○ | ○ | ○ |
| | transfer efficiency | | ○ | ○ | ○ | ○ | ○ |
| cured film properties | 60° gloss | | 93 | 91 | 91 | 86 | 92 |
| | distinctness of image | | ○ | ○ | ○ | ○ | ○ |
| | accelerated weathering test golss retention (%) | 1000 hours | 100 | 100 | 100 | 99 | 100 |
| | | 2000 hours | 99 | 97 | 99 | 99 | 98 |
| | | 3000 hours | 95 | 95 | 96 | 97 | 95 |
| | | 4000 hours | 92 | 93 | 93 | 96 | 90 |
| | | 5000 hours | 91 | 92 | 91 | 93 | 87 |
| | | 6000 hours | 90 | 92 | 91 | 92 | 85 |
| | moisture resistance | | ○ | ○ | ○ | ○ | ○ |
| | xylene rubbing resistance | | ○ | ○ | ○ | ○ | ○ |
| | acid resistance | | ○ | ○ | ○ | ○ | ○ |
| | alkali resistance | | ○ | ○ | ○ | ○ | ○ |
| | oil ink stain resistance | black | ○ | ○ | ○ | ○ | ○ |
| | | red | ○ | ○ | ○ | ○ | ○ |
| | pencil hardness (breaking) | | 3H | 3H | 4H | 4H | 3H |
| | pencil hardness (cloud) | | F | H | H~2H | H | H |
| | adhesive property | | ○ | ○ | ○ | ○ | ○ |
| | appearance of a thick coated | | Δ | Δ | Δ | Δ | Δ |
| | stain property in atomospheric exposure (ΔL) | | 0.8 | 3.0 | 1.0 | 1.5 | 0.7 |
| | stain after removing stains (ΔL) | | 0.1 | 0.2 | 0.1 | 0.2 | 0.3 |

TABLE 10

| Example | | | 6 | 7 | 8 | 9 | 10 |
|---|---|---|---|---|---|---|---|
| operation efficiency in coating process | atomization | | ○ | ○ | ○ | ○ | ○ |
| | transfer efficiency | | ○ | ○ | ○ | ○ | ○ |
| cured film properties | 60° gloss | | 91 | 93 | 88 | 90 | 91 |
| | distinctness of image | | ○ | ○ | ○ | ○ | ○ |
| | accelerated weathering test golss retention (%) | 1000 hours | 100 | 100 | 98 | 100 | 99 |
| | | 2000 hours | 98 | 98 | 97 | 98 | 97 |
| | | 3000 hours | 95 | 95 | 94 | 96 | 93 |
| | | 4000 hours | 91 | 93 | 90 | 94 | 93 |
| | | 5000 hours | 90 | 91 | 87 | 93 | 92 |
| | | 6000 hours | 90 | 88 | 84 | 93 | 90 |

TABLE 10-continued

| Example | 6 | 7 | 8 | 9 | 10 |
|---|---|---|---|---|---|
| moisture resistance | ○ | ○ | ○ | ○ | ○ |
| xylene rubbing resistance | ○ | ○ | ○ | ○ | ○ |
| acid resistance | ○ | ○ | ○ | ○ | ○ |
| alkali resistance | ○ | ○ | ○ | ○ | ○ |
| oil ink stain resistance  black | ○ | ○ | ○ | ○ | ○ |
| oil ink stain resistance  red | ○ | ○ | ○ | ○ | ○ |
| pencil hardness (breaking) | 4H | 4H | 4H | 4H | 4H |
| pencil hardness (cloud) | 2H | H | H | H | 2H |
| adhesive property | ○ | ○ | ○ | ○ | ○ |
| appearance of a thick coated | Δ | Δ | Δ | Δ | Δ |
| stain property in atomospheric exposure (ΔL) | 1.0 | 1.1 | 1.1 | 1.6 | 1.0 |
| stain after removing stains (ΔL) | 0.1 | 0.2 | 0.2 | 0.1 | 0.3 |

TABLE 11

| Example | | | 11 | 12 | 13 | 14 | 15 |
|---|---|---|---|---|---|---|---|
| operation efficiency in coating process | atomization | | ○ | ○ | ○ | ○ | ○ |
| operation efficiency in coating process | transfer efficiency | | ○ | ○ | ○ | ○ | ○ |
| cured film properties | 60° gloss | | 91 | 85 | 94 | 94 | 91 |
| cured film properties | distinctness of image | | ○ | ○ | ○ | ○ | ○ |
| cured film properties | accelerated weathering test gloss retention (%) | 1000 hours | 99 | 99 | 99 | 99 | 99 |
| cured film properties | | 2000 hours | 99 | 98 | 97 | 94 | 99 |
| cured film properties | | 3000 hours | 98 | 98 | 93 | 90 | 98 |
| cured film properties | | 4000 hours | 96 | 95 | 90 | 87 | 96 |
| cured film properties | | 5000 hours | 95 | 94 | 84 | 92 | 95 |
| cured film properties | | 6000 hours | 93 | 91 | 82 | 79 | 93 |
| cured film properties | moisture resistance | | ○ | ○ | ○ | ○ | ○ |
| cured film properties | xylene rubbing resistance | | ○ | ○ | ○ | ○ | ○ |
| cured film properties | acid resistance | | ○ | ○ | ○ | ○ | ○ |
| cured film properties | alkali resistance | | ○ | ○ | ○ | ○ | ○ |
| cured film properties | oil ink stain resistance  black | | ○ | ○ | ○ | ○ | ○ |
| cured film properties | oil ink stain resistance  red | | ○ | ○ | ○ | ○ | ○ |
| cured film properties | pencil hardness (breaking) | | 4H | 4H | 2H | 3H | 4H |
| cured film properties | pencil hardness (cloud) | | H | H~2H | H | H | H |
| cured film properties | adhesive property | | ○ | ○ | ○ | ○ | ○ |
| cured film properties | appearance of a thick coated | | Δ | Δ | Δ | Δ | Δ |
| cured film properties | stain property in atomospheric exposure (ΔL) | | 1.1 | 1.6 | 0.5 | 0.4 | 0.9 |
| cured film properties | stain after removing stains (ΔL) | | 0.2 | 0.2 | 0.2 | 0.2 | 0.2 |

TABLE 12

| Example | | | 16 |
|---|---|---|---|
| operation efficiency in coating process | atomization | | ○ |
| operation efficiency in coating process | transfer efficiency | | ○ |
| cured film properties | 60° gloss | | 90 |
| cured film properties | distinctness of image | | ○ |
| cured film properties | accelerated weathering test gloss retention (%) | 1000 hours | 100 |
| cured film properties | | 2000 hours | 99 |
| cured film properties | | 3000 hours | 95 |
| cured film properties | | 4000 hours | 92 |
| cured film properties | | 5000 hours | 87 |
| cured film properties | | 6000 hours | 85 |
| cured film properties | moisture resistance | | ○ |
| cured film properties | xylene rubbing resistance | | ○ |
| cured film properties | acid resistance | | ○ |
| cured film properties | alkali resistance | | ○ |
| cured film properties | oil ink stain resistance  black | | ○ |
| cured film properties | oil ink stain resistance  red | | ○ |
| cured film properties | pencil hardness (breaking) | | 4H |
| cured film properties | pencil hardness (cloud) | | 2H |
| cured film properties | adhesive property | | ○ |
| cured film properties | appearance of a thick coated | | Δ |
| cured film properties | stain property in atomospheric exposure (ΔL) | | 1.0 |
| cured film properties | stain after removing stains (ΔL) | | 0.1 |

Reference Examples 1 through 3

By using solvents, monomers and polymerization initiators in kind and amount shown in Table 13, resin solutions were prepared in the same method as described in Preparation Example 1.

The properties of the obtained resins were shown in Table 13.

TABLE 13

| Reference Example | | 1 | 2 | 3 |
|---|---|---|---|---|
| initial (parts by weight) | xylene | 50 | 50 | 50 |
| | isobutyl acetate | 50 | 50 | 50 |
| dropping (parts by weight) | methylmethacrylate | 50 | 67.2 | 63.6 |
| | butylacrylate | 30 | 27.7 | 2.5 |
| | 2-hydroxylethyl methacrylate | 19 | 4.6 | — |
| | 2-hydroxylethyl acrylate | — | — | 33.1 |
| | methacrylic acid | 1 | 0.5 | 0.8 |
| | ABMBN | 2 | 2 | 2 |
| additional (parts by weight) | ABMBN | 0.2 | 0.2 | 0.2 |
| | isobutyl acetate | 2 | 2 | 2 |
| total (parts by weight) | | 204.2 | 204.2 | 204.2 |
| non-volatile matter conc. (percent by weight) | | 50.2 | 50.1 | 50.2 |
| resin properties | glass transition temperature (° C.) | 30 | 40 | 50 |
| | number average molecular weight | 4900 | 4900 | 4800 |
| | hydroxyl value (mgKOH/g) | 80 | 20 | 160 |
| | acid value (mgKOH/g) | 7 | 3 | 5 |

Comparative Example 1

By mixing 49.6 parts by weight of the resin solution obtained in Reference Example 1, 5.0 parts by weight of cyclohexanone, 29.0 parts by weight of the surface-treated silica sol obtained in Preparation Example 15, 0.8 parts by weight of TINUVIN 900 (described above), 0.2 parts by weight of TINUVIN 292 (described above), 1.0 parts by weight of BYK-358, 1.0 parts by weight of 10 percent by weight solution of SCAT-8 and 13.4 parts by weight of DESMODUR BL-3175 under stirring, a coating composition was prepared.

And, the coating composition was diluted by a solvent mixture of SOLVESSO #100® (a product of Esso Co.) and cyclohexanone (in ratio by weight: 50:50) to the viscosity of 15 seconds at 20° C. by Ford cup No.4 and the diluted coating composition was applied on the clear coat test panel by air spraying (atomization pressure: 5 kg/cm$^2$) in the amount to form a film having dried thickness of 30 μm. The coated clear coat test panel was baked at 140° C. for 30 minutes. Further, after being placed for 3 days at room temperature, the cured film properties were evaluated.

The compounding rates of each ingredients in the coating composition, baking conditions and forced drying condition were shown in Table 14 and the cured film properties were shown in Table 16.

Comparative Examples 2 through 7

After coating compositions were prepared in compounding rate shown in Table 14 in the same method as described in Comparative Example 1, cured films were formed on test panels. Baking conditions and forced drying conditions at forming cured films were shown in Table 15 and the cured film properties were shown in Table 17.

TABLE 14

| Comparative Example | | | 1 | 2 | 3 | 4 | 5 |
|---|---|---|---|---|---|---|---|
| compounding rate (parts by weight) | resin solution | kind (Reference Example) | Ref. Ex. 1 | Ref. Ex. 2 | Ref. Ex. 3 | Ref. Ex. 4 | Ref. Ex. 5 |
| | | formulation weight | 49.6 | 72.3 | 60.6 | 74.4 | 18.9 |
| | silica sol | untreated silica sol | — | — | 16.4 | — | — |
| | | Preparation Ex. 15 | 29.0 | 14.5 | — | 4.8 | 73.4 |
| | curing agent | DURANATE THA-100 | — | 3.0 | — | — | 2.5 |
| | | DURANATE 24A-100 | — | — | 13.9 | 10.4 | — |
| | | DISMODUR BL-3175 | 13.4 | — | — | — | — |
| | solvent | cyclohexanone | 5.0 | 7.2 | 6.1 | 7.4 | 1.9 |
| | additive | TINUVIN 900 | 0.8 | 0.8 | 0.8 | 0.8 | 0.8 |
| | | TINUVIN 292 | 0.2 | 0.2 | 0.2 | 0.2 | 0.2 |
| | | BYK-358 | 1.0 | 1.0 | 1.0 | 1.0 | 1.0 |
| | curing catalyst | SCAT-8 (10% by weight solution) | 1.0 | — | — | — | — |
| | | SCAT-8 (1% by weight solution) | — | 1.0 | 1.0 | 1.0 | 1.0 |
| | total | | 100.0 | 100.0 | 100.0 | 100.0 | 100.0 |
| NCO/OH (mole ratio) | | | 1.0 | 1.2 | 0.9 | 1.1 | 1.0 |
| silica sol non-volatile matter/total non-volatile matter (percent by weight) | | | 20.0 | 10.0 | 10.0 | 2.9 | 64.9 |
| baking or forced drying condition | temperature (° C.) | | 150 | 80 | 80 | 80 | 80 |
| | time (minutes) | | 20 | 30 | 30 | 30 | 30 |

TABLE 15

| Comparative Example | | | 6 | 7 |
|---|---|---|---|---|
| compounding rate (parts by weight) | resin solution | kind (Preparation Example) | AROTAN UW2818 | AROTAN UW2818 |
| | | formulation weight | 100 | 100 |
| | | organo silica sol | 50 | — |
| | | organo titania sol | — | 50 |
| | curing agent | DURANATE THA-100 | — | — |
| | | DURANATE 24A-100 | — | — |
| | | DISMODUR BL-3175 | — | — |
| | | CORONATE 2515 | 35.8 | 35.8 |

TABLE 15-continued

| Comparative Example | | | 6 | 7 |
|---|---|---|---|---|
| solvent | cyclohexanone | | — | — |
| additive | TINUVIN 900 | | — | — |
| | TINUVIN 292 | | — | — |
| | BYK-358 | | — | — |
| curing catalyst | SCAT-8 (10% by weight solution) | | — | — |
| | SCAT-8 (1% by weight solution) | | — | — |
| total | | | 185.8 | 185.8 |
| NCO/OH (mole ratio) | | | — | — |
| silica sol non-volatile matter/total non-volatile matter (percent by weight) | | | 10.8 | — |
| baking or forced drying condition | temperature (° C.) | | 160 | 160 |
| | time (minutes) | | 20 | 20 |

AROTAN UW2818: a product of Nippon Shokubai Co., Ltd., an acrylic polyol resin, non-volatile material 60 percent by weight
CORONATE 2515: a product of Nippon Polyurethane Kogyo Co., Ltd., isocyanate, non-volatile material 80 percent by weight
organo silica sol: non-volatile material 30 percent by weight
organo titania sol: non-volatile material 30 percent by weight

TABLE 16

| Comparative Example | | | 1 | 2 | 3 | 4 | 5 |
|---|---|---|---|---|---|---|---|
| operation efficiency in coating process | atomization | | ○ | ○ | ○ | Δ | ○ |
| | transfer efficiency | | ○ | ○ | ○ | ○ | ○ |
| cured film properties | 60° gloss | | 92 | 92 | 91 | 93 | 85 |
| | distinctness of image | | ○ | ○ | ○ | ○ | X |
| | accelerated weathering test (gloss retention (%)) | 1000 hours | 98 | 97 | 91 | 98 | 90 |
| | | 2000 hours | 90 | 91 | 75 | 91 | 81 |
| | | 3000 hours | 84 | 80 | 53* | 77 | 50* |
| | | 4000 hours | 71 | 68 | 42 | 68 | 38 |
| | | 5000 hours | 60 | 53 | 30 | 60 | 22 |
| | | 6000 hours | 49 | 39 | 15 | 51 | 12 |
| | moisture resistance | | ○ | ○ | ○ | ○ | Δ |
| | xylene rubbing resistance | | ○ | X | ○ | ○ | ○ |
| | acid resistance | | ○ | ○ | ○ | ○ | ○ |
| | alkali resistance | | ○ | ○ | ○ | ○ | Δ |
| | oil ink stain resistance | black | Δ | Δ | ○ | Δ | 0 |
| | | red | X | X | Δ | Δ | Δ |
| | pencil hardness (breaking) | | 2 H | 2 H | 3 H | 3 H | 4 H |
| | pencil hardness (cloud) | | H B | H B | F | F | 2 H |
| | adhesive property | | ○ | ○ | ○ | ○ | Δ |
| | appearance of a thick coated | | Δ | Δ | Δ | Δ | Δ |
| | stain property in atomospheric exposure (ΔL) | | 1.1 | 1.5 | 1.5 | 5.0 | 0.5 |
| | stain after removing stains ΔL) | | 1.0 | 1.4 | 1.3 | 2.0 | 0.1 |

*: Cracks exist.

TABLE 17

| Comparative Example | | | 6 | 7 |
|---|---|---|---|---|
| operation efficiency in coating process | atomization | | Δ | Δ |
| | transfer efficiency | | X | X |
| cured film properties | 60° gloss | | 91 | 90 |
| | distinctness of image | | ○ | ○ |
| | accelerated weathering test (gloss retention (%)) | 1000 hours | 97 | 91 |
| | | 2000 hours | 80 | 78 |
| | | 3000 hours | 71 | 57 |
| | | 4000 hours | 50 | 48 |
| | | 5000 hours | 27 | 35 |
| | | 6000 hours | 15 | 21 |
| | moisture resistance | | ○ | ○ |
| | xylene rubbing resistance | | ○ | ○ |
| | acid resistance | | ○ | ○ |
| | alkali resistance | | ○ | ○ |
| | oil ink stain resistance | black | Δ | Δ |
| | | red | X | X |

TABLE 17-continued

| Comparative Example | 6 | 7 |
|---|---|---|
| pencil hardness (breaking) | 4 H | 2 H |
| pencil hardness (cloud) | H | H B |
| adhesive property | ○ | ○ |
| appearance of a thick coated | X | X |
| stain property in atomospheric exposure (ΔL) | 6.0 | 7.5 |
| stain after removing stains ΔL) | 3.8 | 5.9 |

Example 17

By mixing 45.0 parts by weight of the resin solution obtained in Preparation Example 1, 4.5 parts by weight of cyclohexanone, 41.2 parts by weight of the surface-treated silica sol obtained in Preparation Example 15 0.8 parts by weight of TINUVIN 900 (a product of Ciba-Geigy Co., an ultraviolet absorber), 0.2 parts by weight of TINUVIN 292 (a product of Ciba-Geigy Co., a hindered amine antioxidant), 1.0 parts by weight of BYK-358 (a product of Bickemy Co., a leveling agent), 7.3 parts by weight of UVAN 220 (a product of Mitsui Toatsu Chemicals, Inc. a melamine resin) under stirring, a coating composition was prepared.

And, the coating composition was diluted by a solvent mixture of SOLVESSO #100® (a product of Esso Co.) and cyclohexanone (in ratio by weight: 50:50) to the viscosity of 15 seconds at 20° C. by Ford cup No.4 and the diluted coating composition was applied on the clear coat test panel by air spraying (atomization pressure: 5 kg/cm$^2$) in the amount to form a film having dried thickness of 30 μm. The coated clear coat test panel was baked at 140° C. for 30 minutes. Furthermore, after being placed it for 3 days at room temperature, the cured film properties were evaluated.

The compounding rates of each ingredients in the coating composition, baking condition and forced drying condition were shown in Table 18 and the cured film properties were shown in Table 21.

Examples 18 through 30, and 32

After coating compositions were prepared in compounding rate shown in Tables 18 to 20 in the same method as described in Example 17, cured films were formed on test panels. Baking conditions and forced drying conditions at forming cured films were shown in Tables 18 to 20 and the cured film properties were shown in Tables 21 to 23.

Example 31

By mixing and dispersing 52.5 parts by weight of titanium oxide (DUPONT TITANIUM R-960, a product of Dupont Co.), 35.0 parts by weight of the resin solution obtained in Preparation Example 1 and 12.5 parts by weight of cyclohexanone in a motor mill (a product of Eiger Japan Co.) at 3,000 rpm for 40 minutes, a pigment-dispersed coating composition was prepared.

And, 46.9 parts by weight of the pigment-dispersed coating composition, 22.0 parts by weight of the resin solution obtained in Preparation Example 1, 3.0 parts by weight of cyclohexanone, 20.5 parts by weight of the surface-treated silica sol obtained in Preparation Example 15, 0.2 parts by weight of TINUVIN 292, 1.0 parts by weight of BYK-358, 6.4 parts by weight of UVAN 220 (a product of Mitsui Toatsu Chemicals, Inc. a melamine resin) were mixed under stirring and a coating composition was prepared.

Further, the coating composition was diluted by a solvent mixture of SOLVESSO #100® (a product of Esso Co.) and cyclohexanone (in ratio by weight: 50:50) to the viscosity of 15 seconds at 20° C. by Ford cup No.4 and the diluted coating composition was applied on the test panel by air spraying (atomization pressure: 5 kg/cm$^2$) in the amount to form a film having dried thickness of 30 μm. The test panel was baked at 140° C. for 30 minutes. Furthermore, after being placed for 3 days at room temperature, the cured film properties were evaluated.

The cured film properties were shown in Table 23.

TABLE 18

| Example | | | 17 | 18 | 19 | 20 | 21 |
|---|---|---|---|---|---|---|---|
| Compounding rate (parts by weight) | resin solution | kind (Preparation Example) | Prep. Ex. 1 | Prep. Ex. 2 | Prep. Ex. 3 | Prep. Ex. 4 | Prep. Ex. 5 |
| | | formulation weight | 45.0 | 45.0 | 50.0 | 80.0 | 45.0 |
| | silica sol | untreated silica sol | — | 35.9 | — | — | — |
| | | Preparation Ex. 15 | 35.9 | — | 33.0 | 5.0 | 40.9 |
| | curing agent | UVAN 220 | 12.6 | 12.6 | — | — | 7.4 |
| | | UVAN 122 | — | — | — | 6.5 | — |
| | | CYMEL 370 | — | — | 10.0 | — | — |
| | solvent additive | cyclohexanone | 4.5 | 4.5 | 5.0 | 6.5 | 4.6 |
| | | TINUVIN 900 | 0.8 | 0.8 | 0.8 | 0.8 | 0.8 |
| | | TINUVIN 292 | 0.2 | 0.2 | 0.2 | 0.2 | 0.2 |
| | | BYK-358 | 1.0 | 1.0 | 1.0 | 1.0 | 1.0 |
| | curing catalyst | Nacure 4054 | — | — | — | — | 0.1 |
| | | total | 100.0 | 100.0 | 100.0 | 100.0 | 100.0 |
| acryl/melamine (weight ratio of non-volatile matter) | | | 75/25 | 75/25 | 76/24 | 91/9 | 84/16 |
| silica sol non-volatile matter/total non-volatile matter (percent by weight) | | | 26.3 | 26.3 | 20.0 | 10.0 | 31.2 |
| baking or forced drying condition | temperature (° C.) | | 140 | 140 | 140 | 130 | 140 |
| | time (minutes) | | 30 | 30 | 20 | 30 | 30 | notes
UVAN 220: a product of Mitsui Toatsu Chemicals, Inc. a melamine resin (non-volatile material 60 percent by weight)
UVAN 122: a product of Mitsui Toatsu Chemicals, Inc. a melamine resin (non-volatile material 60 percent by weight)
CYMEL 370: a product of Mitsui Cytec Co., Ltd., a melamine resin (non-volatile material 80 percent by weight)
Nacure 4054: a products of King Industry Co., Ltd., phosphoric acid type curing catalyst

TABLE 19

| Example | | | 22 | 23 | 24 | 25 | 26 |
|---|---|---|---|---|---|---|---|
| compounding rate (parts by weight) | resin solution | kind (Preparation Example) | Prep. Ex. 6 | Prep. Ex. 7 | Prep. Ex. 8 | Prep. Ex. 9 | Prep. Ex. 10 |
| | | formulation weight | 52.0 | 54.6 | 54.6 | 70.0 | 50.0 |
| | silica sol | untreated silica sol | — | — | — | — | — |
| | | Preparation Ex. 15 | 32.0 | 27.8 | 27.8 | 15.0 | 30.0 |
| | curing agent | UVAN 220 | — | — | — | — | — |
| | | UVAN 122 | 8.7 | — | — | 6.0 | — |
| | | CYMEL 370 | — | 10.0 | 10.0 | — | 13.3 |
| | solvent additive | cyclohexanone | 5.2 | 5.5 | 5.5 | 7.0 | 4.7 |
| | | TINUVIN 900 | 0.8 | 0.8 | 0.8 | 0.8 | 0.8 |
| | | TINUVIN 292 | 0.2 | 0.2 | 0.2 | 0.2 | 0.2 |
| | | BYK-358 | 1.0 | 1.0 | 1.0 | 1.0 | 1.0 |
| | curing catalyst | Nacure 4054 | 0.1 | 0.1 | 0.1 | — | — |
| | | total | 100.0 | 100.0 | 100.0 | 100.0 | 100.0 |

TABLE 19-continued

| Example | | 22 | 23 | 24 | 25 | 26 |
|---|---|---|---|---|---|---|
| acryl/melamine (weight ratio of non-volatile matter) | | 83/17 | 77/23 | 77/23 | 91/9 | 70/30 |
| silica sol non-volatile matter/total non-volatile matter (percent by weight) | | 23.5 | 19.1 | 19.1 | 10.4 | 20.1 |
| baked or forced drying condition | temperature (°C.) | 140 | 130 | 120 | 140 | 140 |
| | time (minutes) | 30 | 30 | 30 | 30 | 30 |

TABLE 20

| Example | | | 27 | 28 | 29 | 30 | 32 |
|---|---|---|---|---|---|---|---|
| compounding rate (parts by weight) | resin solution | kind (Preparation Example) | Prep. Ex. 11 | Prep. Ex. 12 | Prep. Ex. 13 | Prep. Ex. 14 | Prep. Ex. 16 |
| | | formulation weight | 53.6 | 63.0 | 36.4 | 23.7 | 45.0 |
| | silica sol | untreated silica sol | — | — | — | — | — |
| | | Preparation Ex. 15 | 29.5 | 16.2 | 52.9 | 68.0 | 35.9 |
| | curing agent | UVAN 220 | 9.5 | — | — | — | 12.6 |
| | | UVAN 122 | — | 12.6 | 5.1 | 4.1 | — |
| | | CYMEL 370 | — | — | — | — | — |
| | solvent additive | cyclohexanone | 5.4 | 6.2 | 3.6 | 2.2 | 4.5 |
| | | TINUVIN 900 | 0.8 | 0.8 | 0.8 | 0.8 | 0.8 |
| | | TINUVIN 292 | 0.2 | 0.2 | 0.2 | 0.2 | 0.2 |
| | | BYK-358 | 1.0 | 1.0 | 1.0 | 1.0 | 1.0 |
| | curing catalyst | Nacure 4054 | — | — | — | — | — |
| | | total | 100.0 | 100.0 | 100.0 | 100.0 | 100.0 |
| acryl/melamine (weight ratio of non-volatile matter) | | | 83/17 | 81/19 | 86/14 | 83/17 | 75/25 |
| silica sol non-volatile matter/total non-volatile matter (percent by weight) | | | 21.3 | 11.0 | 42.7 | 58.7 | 26.3 |
| baking or forced drying condition | temperature (°C.) | | 140 | 140 | 130 | 130 | 140 |
| | time (minutes) | | 30 | 30 | 30 | 30 | 30 |

TABLE 21

| Example | | 17 | 18 | 19 | 20 | 21 |
|---|---|---|---|---|---|---|
| operation efficiency in coating process | atomization | ○ | ○ | ○ | ○ | ○ |
| | transfer efficiency | ○ | ○ | ○ | ○ | ○ |
| cured film properties | 60° gloss | 92 | 92 | 91 | 94 | 93 |
| | distinctness of image | ○ | ○ | ○ | ○ | ○ |
| | accelerated weathering test gloss retention (%) | 1000 hours | 100 | 99 | 98 | 99 | 100 |
| | | 2000 hours | 98 | 99 | 97 | 98 | 98 |
| | | 3000 hours | 95 | 97 | 94 | 95 | 95 |
| | | 4000 hours | 92 | 96 | 90 | 93 | 90 |
| | | 5000 hours | 90 | 93 | 87 | 91 | 87 |
| | | 6000 hours | 88 | 90 | 83 | 86 | 81 |
| | moisture resistance | ○ | ○ | ○ | ○ | ○ |
| | xylene rubbing resistance | ○ | ○ | ○ | ○ | ○ |
| | acid resistance | ○ | ○ | ○ | ○ | ○ |
| | alkali resistance | ○ | ○ | ○ | ○ | ○ |
| | oil ink stain resistance | black | ○ | ○ | ○ | ○ | ○ |
| | | red | ○ | ○ | ○ | ○ | ○ |
| | pencil hardness (breaking) | 3 H | 3 H | 3 H | 3 H | 3 H |
| | pencil hardness (cloud) | H | H | H | H | H |
| | adhesive property | ○ | ○ | ○ | ○ | ○ |
| | appearance of a thick coated | Δ | Δ | Δ | Δ | Δ |
| | stain property in atomospheric exposure (ΔL) | 0.9 | 0.8 | 1.2 | 1.5 | 0.6 |
| | stain after removing stains (ΔL) | 0.3 | 0.3 | 0.4 | 0.5 | 0.2 |

TABLE 22

| Example | | 22 | 23 | 24 | 25 | 26 |
|---|---|---|---|---|---|---|
| operation efficiency | atomization | ○ | ○ | ○ | ○ | ○ |
| in coating process | transfer efficiency | ○ | ○ | ○ | ○ | ○ |
| cured film properties | 60° gloss | 91 | 95 | 90 | 91 | 92 |
| | distinctness of image | ○ | ○ | ○ | ○ | ○ |
| | accelerated weathering test gloss retention (%) 1000 hours | 99 | 100 | 99 | 100 | 100 |
| | 2000 hours | 98 | 98 | 97 | 99 | 97 |
| | 3000 hours | 96 | 96 | 93 | 94 | 95 |
| | 4000 hours | 93 | 94 | 93 | 92 | 93 |
| | 5000 hours | 91 | 93 | 89 | 89 | 90 |
| | 6000 hours | 88 | 91 | 87 | 86 | 87 |
| | moisture resistance | ○ | ○ | ○ | ○ | ○ |
| | xylene rubbing resistance | ○ | ○ | ○ | ○ | ○ |
| | acid resistance | ○ | ○ | ○ | ○ | ○ |
| | alkali resistance | ○ | ○ | ○ | ○ | ○ |
| | oil ink stain resistance black | ○ | ○ | ○ | ○ | ○ |
| | red | ○ | ○ | ○ | ○ | ○ |
| | pencil hardness (breaking) | 2H | 2H | 2H | 3H | 3H |
| | pencil hardness (cloud) | F | H | H | H | H |
| | adhesive property | ○ | ○ | ○ | ○ | ○ |
| | appearance of a thick coated | Δ | Δ | Δ | Δ | Δ |
| | stain property in atomospheric exposure (ΔL) | 1.1 | 1.2 | 1.3 | 1.7 | 1.0 |
| | stain after removing stains (ΔL) | 0.5 | 0.6 | 0.6 | 0.4 | 0.2 |

TABLE 23

| Example | | 27 | 28 | 29 | 30 | 31 | 32 |
|---|---|---|---|---|---|---|---|
| operation efficiency in coating process | atomization | ○ | ○ | ○ | ○ | ○ | ○ |
| | transfer efficiency | ○ | ○ | ○ | ○ | ○ | ○ |
| cured film properties | 60° gloss | 91 | 90 | 86 | 90 | 89 | 89 |
| | distinctness of image | ○ | ○ | ○ | ○ | ○ | ○ |
| | accelerated weathering test gloss retention (%) 1000 hours | 99 | 100 | 99 | 99 | 99 | 100 |
| | 2000 hours | 96 | 99 | 99 | 98 | 97 | 98 |
| | 3000 hours | 90 | 95 | 98 | 98 | 93 | 95 |
| | 4000 hours | 87 | 92 | 96 | 95 | 90 | 92 |
| | 5000 hours | 82 | 88 | 95 | 93 | 83 | 90 |
| | 6000 hours | 77 | 84 | 89 | 91 | 80 | 88 |
| | moisture resistance | ○ | ○ | ○ | ○ | ○ | ○ |
| | xylene rubbing resistance | ○ | ○ | ○ | ○ | ○ | ○ |
| | acid resistance | ○ | ○ | ○ | ○ | ○ | ○ |
| | alkali resistance | ○ | ○ | ○ | ○ | ○ | ○ |
| | oil ink stain resistance black | ○ | ○ | ○ | ○ | ○ | ○ |
| | red | ○ | ○ | ○ | ○ | ○ | ○ |
| | pencil hardness (breaking) | 3H | 3H | 3H | 3H | 4H | 4H |
| | pencil hardness (cloud) | H | H | 2H | 2H | 2H | 2H |
| | adhesive property | ○ | ○ | ○ | ○ | ○ | ○ |
| | appearance of a thick coated | Δ | Δ | Δ | Δ | Δ | Δ |
| | stain property in atomospheric exposure (ΔL) | 1.2 | 1.8 | 0.3 | 0.3 | 0.9 | 0.9 |
| | stain after removing stains (ΔL) | 0.2 | 0.3 | 0.0 | 0.1 | 0.2 | 0.2 |

Comparative Example 8

By mixing 49.6 parts by weight of the resin solution obtained in Reference Example 1, 5.0 parts by weight of cyclohexanone, 29.0 parts by weight of the surface-treated silica sol obtained in Preparation Example 15, 0.8 parts by weight of TINUVIN 900 (described above), 0.2 parts by weight of TINUVIN 292, 1.0 parts by weight of BYK-358 and 14.4 parts by weight of UVAN 220 (described above) under stirring, a coating composition was prepared.

And, the coating composition was diluted by a solvent mixture of SOLVESSO #100® (a product of Esso Co.) and cyclohexanone (in ratio by weight: 50:50) to the viscosity of 15 seconds at 20° C. by Ford cup No.4 and the diluted coating composition was applied on the clear coat test panel by air spraying (atomization pressure: 5 kg/cm²) in the amount to form a film having dried thickness of 30 μm. The coated clear coat test panel was baked at 140° C. for 30 minutes. Further, after being placed for 3 days at room temperature, the cured film properties were evaluated.

The compounding rates of each ingredients in the coating composition, baking conditions and forced drying condition were shown in Table 24 and the cured film properties were shown in Table 25.

Comparative Examples 9 through 12

After coating compositions were prepared in compounding rate shown in Table 24 in the same method as described in Comparative Example 1, cured films were formed on test panels. Baking conditions and forced drying conditions at forming cured films were shown in Table 24 and the cured film properties were shown in Table 25.

TABLE 24

| Comparative Example | | | 8 | 9 | 10 | 11 | 12 |
|---|---|---|---|---|---|---|---|
| compounding rate (parts by weight) | resin solution | kind (Reference Example) | Ref. Ex.1 | Ref. Ex. 2 | Ref. Ex. 3 | Ref. Ex. 4 | Ref. Ex. 13 |
| | | formulation weight | 50.9 | 72.3 | 61.0 | 77.5 | 20.0 |
| | silica sol | untreated silica sol | — | — | 16.9 | — | — |
| | | Preparation Ex. 15 | 29.0 | 14.5 | — | 0.5 | 73.7 |
| | curing agent | UVAN 220 | — | 3.9 | — | — | 2.6 |
| | | UVAN 122 | — | — | 14.0 | 12.6 | — |
| | | CYMEL 370 | 13.0 | — | — | — | — |
| | solvent | cyclohexanone | 5.0 | 7.2 | 6.1 | 7.4 | 1.7 |
| | additive | TINUVIN 900 | 0.8 | 0.8 | 0.8 | 0.8 | 0.8 |
| | | TINUVIN 292 | 0.2 | 0.2 | 0.2 | 0.2 | 0.2 |
| | | BYK - 358 | 1.0 | 1.0 | 1.0 | 1.0 | 1.0 |
| | curing catalyst | Nacure 4054 | 0.1 | 0.1 | — | — | — |
| | total | | 100.0 | 100.0 | 100.0 | 100.0 | 100.0 |
| acryl/melamine (weight ratio of non-volatile matter) | | | 71/29 | 94/6 | 78/22 | 84/16 | 87/13 |
| silica sol non-volatile matter/total non-volatile matter (percent by weight) | | | 19.5 | 10.1 | 11.5 | 0.6 | 65.6 |
| baking or forced drying condition | temperature (°C.) | | 140 | 140 | 140 | 130 | 140 |
| | time (minutes) | | 0 | 30 | 30 | 30 | 30 |

TABLE 25

| Comparative Example | | 8 | 9 | 10 | 11 | 12 |
|---|---|---|---|---|---|---|
| operation efficiency in coating process | atomization | ○ | ○ | ○ | Δ | ○ |
| | transfer efficiency | ○ | ○ | ○ | ○ | ○ |
| cured film properties | 60° gloss | 92 | 92 | 91 | 93 | 85 |
| | distinctness of image | ○ | ○ | ○ | ○ | X |
| | accelerated weathering 1000 hours | 98 | 97 | 91 | 98 | 91 |
| | 2000 hours | 90 | 91 | 75 | 91 | 82 |

TABLE 25-continued

| Comparative Example | | | 8 | 9 | 10 | 11 | 12 |
|---|---|---|---|---|---|---|---|
| ties | test | 3000 hours | 84 | 80 | 53* | 75 | 50* |
| | gloss | 4000 hours | 71 | 68 | 42 | 69 | 36 |
| | retention (%) | 5000 hours | 60 | 53 | 30 | 59 | 25 |
| | | 6000 hours | 49 | 39 | 15 | 53 | 10 |
| moisture resistance | | | ◯ | ◯ | ◯ | ◯ | Δ |
| xylene rubbing resistance | | | ◯ | X | ◯ | ◯ | ◯ |
| acid resistance | | | ◯ | ◯ | ◯ | ◯ | ◯ |
| alkali resistance | | | ◯ | ◯ | ◯ | ◯ | Δ |
| oil ink stain | black | | Δ | Δ | ◯ | X | ◯ |
| resistance | red | | X | X | Δ | X | Δ |
| pencil hardness (breaking) | | | 2 H | 2 H | 3 H | 3 H | 4 H |
| pencil hardness (cloud) | | | H B | H B | F | F | 2 H |
| adhesive property | | | ◯ | ◯ | ◯ | ◯ | Δ |
| appearance of a thick coated | | | Δ | Δ | Δ | Δ | Δ |
| stain property in atomospheric exposure (ΔL) | | | 2.9 | 4.1 | 4.0 | 8.0 | 0.5 |
| stain after removing stains (ΔL) | | | 1.5 | 1.9 | 2.0 | 7.5 | 0.2 | note
*: generation of cracks

PREPARATION EXAMPLE 17

Into a reaction vessel equipped with a stirrer, a thermometer, a reflux condenser having a Dien·Stark trap, a dropping funnel and a decompression device, 180.2 parts by weight of SNOWTEX-O (a trade name, a product of Nissan Chemical Industries Co. Ltd., a water-based dispersing silica sol, average particle diameter: 20 nm) and 63.1 parts by weight of isopropyl alcohol were charged and the mixture was heated under reduced pressure of 150 to 170 mmHg to 42° C. And then dehydration by azeotropic distillation was carried out with continuously dropping of 1216.2 parts by weight of isopropyl alcohol for 10 hours and 234.2 parts by weight of silca sol dispersed in isopropyl alcohol was obtained. Water content of the silca sol dispersed in isopropyl alcohol was 0.8 percent by weight as determined by Karl Fischer's moisture titration method. Further, 9 parts by weight of methyltrimethoxysilane was added into the silca sol dispersed in isopropyl alcohol and reacted under atmospheric pressure at 40° C. for 24 hours. And isopropyl alcohol was removed from the silca sol dispersed in isopropyl alcohol by reducing at reduced pressure of 150 to 170 mmHg with dropping 360.4 parts by weight of cyclohexanone. Then, a part of cyclohexanone was removed from the silca sol dispersed in cyclohexanone at inner temperature of 50 to 55° C. and 100 parts by weight of the silca sol dispersed in light yellow and transparent cyclohexanone (average particle diameter: 30 nm) was obtained. The non-volatile material of the obtained silca sol dispersed in cyclohexanone was 45 percent by weight and water content was 0.1 percent by weight.

PREPARATION EXAMPLES 18 through 20

By using ingredients in the amount shown in Table 26, dispersing components of silica sol were obtained in the same method as described in Preparation Example 17. The average particle diameter of dispersing components of silica sol of Preparation Example 18, 19 and 20 were each 28 nm, 31 nm and 28 nm.

TABLE 26

| Preparation Example | 17 | 18 | 19 | 20 |
|---|---|---|---|---|
| water-based silica sol | | | | |
| SNOWTEX O | 180.2 | — | — | 180.2 |
| SNOWTEX N | — | 180.2 | 180.2 | — |
| initial solvent | | | | |
| isopropyl alcohol | 63.1 | 63.1 | — | — |
| n-propyl alcohol | — | — | 63.1 | — |
| isopropyl alcohol/n-propyl alcohol = 75/25 | — | — | — | 63.1 |
| continuous dropping solvent | | | | |
| isopropyl alcohol | 1216.2 | 1373.0 | — | — |
| n-propyl alcohol | — | — | 436.1 | — |
| isopropyl alcohol/n-propyl alcohol = 75/25 | — | — | — | 818.4 |
| weight in middle stage (parts by weight) | 234.2 | — | — | — |
| water content in middle stage (parts by weight) | 0.8 | — | — | — |
| silane coupling agent | | | | |
| mthyltrimethoxysilane | 9.0 | — | 4.5 | — |
| γ-glycidoxypropyltri-methoxysilane | — | 7.9 | — | — |
| γ-methacryloiloxypropyl-trimethoxysilane | — | — | — | 12.4 |
| solvent in second stage | | | | |
| cyclohexanone | 360.4 | — | — | — |
| isophorone | — | 95.0 | — | — |
| methylisobutylketone | — | — | 120.0 | — |
| butyrosersolv | — | — | — | 90.0 |
| yield (parts by weight) | 100.0 | 100.0 | 100.0 | 100.0 |
| non-volatile material (% by weight) | 45.0 | 45.0 | 45.0 | 45.0 |
| water content (% by weight) | 0.1 | 0.1 | 0.1 | 0.2 |

Preparation Example 21

Into a reaction vessel equipped with a stirrer, a thermometer, a reflux condenser and a dropping funnel, 33.3 parts by weight of xylene and 33.3 parts by weight of isobutyl-acetate were charged and the mixture was heated to keep at the temperature of 110° C.

To the mixture kept at 110° C., a mixture of 61 parts by weight of methyl-methacrylate, 19 parts by weight of butyl-acrylate, 19 parts by weight of 2-hydroxyethyl-methacrylate, 1 part by weight of methacrylic acid and 1.7 parts by weight of 2,2'-azobis (2-methylbutyronitrile) was added by dropping for 2 hours. After the completion of dropping, the mixture was kept stirring at 110° C. for 1 hour. and a mixture of 0.2 parts by weight of 2,2'-azobis (2-methylbutyronitrile) and 2 parts by weight of isobutyl-acetate was added and the mixture was kept stirring for further 1 hour. After completion of polymerization, 36.9 parts by weight of the dispersing component of silca sol dispersed in cyclohexanone obtained in Prep. Ex. 17 was dropped by a dropping funnel for 10 minutes and then the mixture was kept stirring for further 30 minutes. The resultant organic-inorganic composite solution containing 57 parts by weight of non-volatile material was obtained. The obtained organic-inorganic composite had a glass transition temperature of 54° C., a number average molecular weight of 5200, a hydroxyl value of 70 mmKOH/g and an acid value of 6 mmKOH/g.

Preparation Examples 22 through 27

By using ingredients in the amount shown in Tables 27 and 28, organic-inorganic composite solutions were obtained in the same method as described in Preparation Example 21.

TABLE 27

| Preparation Example | | 21 | 22 | 23 | 24 | 25 |
|---|---|---|---|---|---|---|
| initial (parts by weight) | xylene | 33.3 | 33.3 | 33.3 | 33.3 | 33.3 |
| | isobutylacetate | 33.3 | 33.3 | 33.3 | 33.3 | 33.3 |
| dorpping (parts by weight | methylmethacrylate | 61.0 | 63.0 | 70.0 | 21.0 | 61.5 |
| | butylacrylate | 19.0 | 8.0 | 10.0 | 6.0 | 13.5 |
| | cyclohexyl-methacrylate | — | — | — | 51.0 | 51.0 |
| | glycidylmeth-acrylate | — | — | — | — | 5.0 |
| | 2-hydroxyethyl-methacrylate | 19.0 | 28.0 | 19.0 | 21.0 | 19.0 |
| | methacrylic acid | 1.0 | 1.0 | 1.0 | 1.0 | 1.0 |
| | ABMBN | 1.7 | 1.7 | 0.9 | 1.7 | 1.7 |
| additional (parts by weight) | ABMBN | 0.2 | 0.2 | 0.2 | 0.2 | 0.2 |
| | isobutyl acetate | 2.0 | 2.0 | 2.0 | 2.0 | 2.0 |
| silica sol (parts by weight) | Preparation Example 17 | 36.9 | — | — | — | 36.9 |
| | Preparation Example 18 | — | 36.9 | — | — | — |
| | Preparation Example 19 | — | — | 73.8 | — | — |
| | Preparation Example 20 | — | — | — | 55.6 | — |
| total (parts by weight) | | 207.4 | 207.4 | 243.5 | 226.1 | 207.4 |
| non-volatile material conc. (% by weight) | | 56.2 | 56.5 | 55.0 | 55.5 | 56.4 |
| organic-inorganic composite properties | glass transition temperature (°C.) | 54 | 74 | 78 | 76 | 64 |
| | number average molecular weight | 5200 | 5500 | 13000 | 5000 | 5100 |
| | hydroxyl value (mgKOH/g) | 70 | 104 | 62 | 72 | 70 |
| | acid value (mgKOH/g) | 6 | 6 | 5 | 5 | 6 |

TABLE 28

| Preparation Example | | 26 | 27 |
|---|---|---|---|
| initial (parts by weight) | xylene | 33.3 | 33.3 |
| | isobutylacetate | 33.3 | 33.3 |
| dorpping (parts by weight) | methylmethacrylate | 21.0 | 21.0 |
| | butylacrylate | 6.0 | 6.0 |
| | cyclohexylmethacrylate | 51.0 | 51.0 |
| | glycidylmethacrylate | — | — |
| | 2-hydroxyethylmethacrylate | 21.0 | 21.0 |
| | methacrylic acid | 1.0 | 1.0 |
| | ABMBN | 5.0 | 0.2 |
| additional (parts by weight) | ABMBN | 0.2 | 0.2 |
| | isobutyl acetate | 2.0 | 2.0 |
| silica sol (parts by weight) | Preparation Example 17 | — | — |
| | Preparation Example 18 | — | — |
| | Preparation Example 19 | 55.6 | 55.6 |
| | Preparation Example 20 | — | — |
| total (parts by weight) | | 229.4 | 224.6 |
| non-volatile material conc. (% by weight) | | 55.8 | 56.0 |
| organic-inorganic composite properties | glass transition temperature (°C.) | 76 | 76 |
| | number average molecular weight | 2300 | 20000 |
| | hydroxyl value (mgKOH/g) | 72 | 72 |
| | acid value (mgKOH/g) | 5 | 5 |

Examples 33 through 40

Coating compositions were prepared in the compounding rate shown in Tables 29 and 30 in the same method as described in Example 1 and cured films were formed on the test panels. Baking conditions and forced drying conditions at forming cured films were shown in Tables 29 and 30 and the cured film properties were shown in Tables 31 and 32.

TABLE 29

| Example | | | 33 | 34 | 35 | 36 | 37 |
|---|---|---|---|---|---|---|---|
| compounding rate (parts by weight) | organic-inorganic composite solution | kind (Preparation Example) | Prep. Ex. 21 | Prep. Ex. 22 | Prep. Ex. 23 | Prep. Ex. 24 | Prep. Ex. 23 |
| | silica sol | kind | Prep. Ex. 17 | Prep. Ex. 18 | Prep. Ex. 19 | Prep. Ex. 20 | Prep. Ex. 19 |
| | | formulation weight | 5.2 | 20.0 | 0.4 | 0.5 | 0.4 |
| | curing agent | DURANATE THA-100 | 11.0 | — | 11.8 | — | 11.8 |
| | | DURANATE 24A-100 | — | 11.8 | — | — | — |
| | | DISMODUR BL-3175 | — | — | — | 19.9 | — |
| | solvent | cyclohexanone | 1.9 | 2.0 | 2.0 | 2.0 | 2.0 |
| | additive | TINUVIN 900 | 0.8 | 0.8 | 0.8 | 0.8 | 0.8 |
| | | TINUVIN 292 | 0.2 | 0.2 | 0.2 | 0.2 | 0.2 |
| | | BYK-358 | 1.0 | 1.0 | 1.0 | 1.0 | 1.0 |
| | curing catalyst | SCAT-8 (1% by weight solution) | — | — | — | 1.0 | — |
| | | SCAT-8 (1% by weight solution) | 1.0 | 1.0 | 1.0 | — | 1.0 |
| total | | | 100.0 | 100.0 | 100.0 | 100.0 | 100.0 |
| NCO/OH (mole ratio) | | | 1.0 | 1.0 | 1.2 | 1.0 | 1.0 |
| silica sol non-volatile matter/total non-volatile matter (percent by weight) | | | 15 | 25 | 20 | 15 | 20 |
| baking or forced drying condition | temperature (°C.) | | 120 | 140 | 80 | 150 | room temp. |
| | time (minutes) | | 25 | 20 | 30 | 25 | 240 |

TABLE 30

| Example | | | 38 | 39 | 40 |
|---|---|---|---|---|---|
| compounding rate (parts by weight) | organic-inorganic composite solution | kind (Preparation Example) | Prep. Ex. 25 | Prep. Ex. 26 | Prep. Ex. 27 |
| | | formulation weight | 78.9 | 74.6 | 82.8 |
| | silica sol | kind | Prep. Ex. 17 | Prep. Ex. 19 | Prep. Ex. 19 |
| | | formulation weight | 5.2 | 0.5 | 0.4 |
| | curing agent | DURANATE THA-100 | 11.0 | — | 11.8 |
| | | DURANATE 24A-100 | — | — | — |
| | | DISMODUR | — | 19.9 | — |
| | solvent | cyclohexanone | 1.9 | 2.0 | 2.0 |
| | additive | TINUVIN 900 | 0.8 | 0.8 | 0.8 |
| | | TINUVIN 292 | 0.2 | 0.2 | 0.2 |
| | | BYK-358 | 1.0 | 1.0 | 1.0 |
| | curing catalyst | SCAT-8 (10% by weight solution) | — | 1.0 | — |
| | | SCAT-8 (1% by weight solution) | 1.0 | — | 1.0 |
| total | | | 100.0 | 100.0 | 100.0 |
| NCO/OH (mole ratio) | | | 1.0 | 1.0 | 1.0 |
| silica sol non-volatile matter/total non-volatile matter (percent by weight) | | | 15 | 15 | 16 |
| baking or forced drying condition | temperature (°C.) | | 120 | 150 | room temp. |
| | time (minutes) | | 25 | 25 | 600 |

TABLE 31

| Example | | 33 | 34 | 35 | 36 | 37 |
|---|---|---|---|---|---|---|
| operation efficiency | atomization | ◎ | ◎ | ◎ | ◎ | ◎ |
| in coating process | transfer efficiency | ◎ | ◎ | ◎ | ◎ | ◎ |
| cured film properties | 60° gloss | 93 | 91 | 90 | 91 | 90 |
| | distinctness of image | ○ | ○ | ○ | ○ | ○ |
| | accelerated weathering test gloss retention (%) 1000 hours | 100 | 100 | 100 | 100 | 100 |
| | 2000 hours | 99 | 98 | 97 | 97 | 97 |
| | 3000 hours | 95 | 95 | 97 | 95 | 96 |
| | 4000 hours | 93 | 93 | 95 | 93 | 95 |
| | 5000 hours | 93 | 92 | 94 | 91 | 94 |
| | 6000 hours | 92 | 91 | 93 | 90 | 92 |
| | moisture resistance | ○ | ○ | ○ | ○ | ○ |
| | xylene rubbing resistance | ○ | ○ | ○ | ○ | ○ |
| | acid resistance | ○ | ○ | ○ | ○ | ○ |
| | alkali resistance | ○ | ○ | ○ | ○ | ○ |
| | oil ink stain resistance  black | ○ | ○ | ○ | ○ | ○ |
| | red | ○ | ○ | ○ | ○ | ○ |
| | pencil hardness (breaking) | 3 H | 4 H | 4 H | 4 H | 3 H |
| | pencil hardness (cloud) | F | 2 H | H | H | H |
| | adhesive property | ○ | ○ | ○ | ○ | ○ |
| | appearance of a thick coated | ○ | ○ | ○ | ○ | ○ |
| | stain property in atomospheric exposure (ΔL) | 1.3 | 0.7 | 1.0 | 1.1 | 0.9 |
| | stain after removing stains (ΔL) | 0.2 | 0.1 | 0.1 | 0.0 | 0.1 |

TABLE 32

| Example | | 38 | 39 | 40 |
|---|---|---|---|---|
| operation efficiency | atomization | ◎ | ◎ | ○ |
| in coating process | transfer efficiency | ◎ | ◎ | ○ |
| cured film properties | 60° gloss | 91 | 93 | 87 |
| | distinctness of image | ○ | ○ | ○ |
| | accelerated weathering test gloss retention (%) 1000 hours | 99 | 99 | 100 |
| | 2000 hours | 97 | 97 | 98 |
| | 3000 hours | 95 | 94 | 96 |
| | 4000 hours | 94 | 94 | 95 |
| | 5000 hours | 93 | 91 | 94 |
| | 6000 hours | 91 | 89 | 91 |
| | moisture resistance | ○ | ○ | ○ |
| | xylene rubbing resistance | ○ | ○ | ○ |
| | acid resistance | ○ | ○ | ○ |
| | alkali resistance | ○ | ○ | ○ |
| | oil ink stain resistance  black | ○ | ○ | ○ |
| | red | ○ | ○ | ○ |
| | pencil hardness (breaking) | 3 H | 3 H | 4 H |
| | pencil hardness (cloud) | F | H | 2 H |
| | adhesive property | ○ | ○ | ○ |
| | appearance of a thick coated | ○ | ○ | ○ |
| | stain property in atomospheric exposure (ΔL) | 13 | 12 | 13 |
| | stain after removing stains (ΔL) | 0.2 | 0.2 | 0.0 |

Example 41

By mixing and dispersing 58.3 parts by weight of titanium oxide (DUPONT TITANIUM R-960, a product of Dupont Co.), 34.6 parts by weight of the organic-inorganic composite solution obtained in Preparation Example 21 and 7.1 parts by weight of cyclohexanone with zircon beads as media in a motor mill (a product of Eiger Japan Co.) at 3,000 rpm for 40 minutes, a pigment-dispersed coating composition solution was prepared.

And, 42.6 parts by weight of the pigment-dispersed coating composition solution, 35.3 parts by weight of the organic-inorganic composite solution obtained in Preparation Example 21, 13.0 parts by weight of the surface-treated silica sol obtained in Preparation Example 17, 0.2 parts by weight of TINUVIN 292, 1.0 parts by weight of BYK-358, 1.0 parts by weight of 1 percent by weight solution of SCAT-8 and 6.9 parts by weight of DURANATE THA-100 were mixed under stirring and a coating composition was prepared.

Examples 42 through 45

Coating compositions were prepared in the compounding rate shown in Table 33 in the same method as described in Example 38 and cured films were formed on the test panels. Baking conditions and forced drying conditions at forming cured films were shown in Table 33 and the cured film properties were shown in Table 34.

TABLE 33

| Example | | | 41 | 42 | 43 | 44 | 45 |
|---|---|---|---|---|---|---|---|
| pigment-dispersed organic-inorganic composite solution | titanium oxide | | 58.3 | 58.3 | 58.3 | 58.3 | 58.3 |
| | organic-inorganic composite solution | | Prep. Ex. 21 | Prep. Ex. 22 | Prep. Ex. 23 | Prep. Ex. 24 | Prep. Ex. 23 |
| | formulation weight | | 34.6 | 34.6 | 40.6 | 37.7 | 40.6 |
| | cyclohexanone | | 7.1 | 7.1 | 1.1 | 4.0 | 1.1 |
| | sub total | | 100.0 | 100.0 | 100.0 | 100.0 | 100.0 |
| compounding rate (parts by weight) | pigment-dispersed organic-inorganic composite solution described above | | 42.6 | 35.9 | 40.2 | 42.6 | 40.2 |
| | organic-inorganic composite solution | kind (Prep.) | Prep. Ex. 21 | Prep. Ex. 22 | Prep. Ex. 23 | Prep. Ex. 24 | Prep. Ex. 23 |
| | | formulation amount | 35.3 | 26.7 | 36.7 | 32.3 | 36.7 |
| | silica sol | kind (Prep. Ex.) | Prep. Ex. 17 | Prep. Ex. 18 | Prep. Ex. 19 | Prep. Ex. 20 | Prep. Ex. 19 |
| | | formulation amount | 13.0 | 27.9 | 13.3 | 10.0 | 13.3 |
| | curing agent | DURANATE THA-100 | 6.9 | — | 7.6 | — | 7.6 |
| | | DURANATE 24A-100 | — | 7.3 | — | — | — |
| | | DISMODUR BL-3175 | — | — | — | 12.9 | — |
| | additives | TINUVIN 292 | 0.2 | 0.2 | 0.2 | 0.2 | 0.2 |
| | | BYK-358 | 1.0 | 1.0 | 1.0 | 1.0 | 1.0 |
| | curing catalyst | SCAT-8 (10% by weight solution) | — | — | — | 1.0 | — |
| | | SCAT-8 (1% by weight solution) | 1.0 | 1.0 | 1.0 | — | 1.0 |
| | total | | 100.0 | 100.0 | 100.0 | 100.0 | 100.0 |
| NCO/OH (mole ratio) | | | 1.0 | 1.0 | 1.2 | 1.0 | 1.2 |
| silica sol non-volatile matter total non-volatile matter (% by weight) | | | 15 | 25 | 20 | 15 | 20 |
| baked or forced drying condition | temperature (°C.) | | 120 | 140 | 80 | 150 | room temp. |
| | time (minutes) | | 25 | 20 | 30 | 25 | 240 |

TABLE 34

| Example | | 41 | 42 | 43 | 44 | 45 |
|---|---|---|---|---|---|---|
| operation efficiency | atomization | ◎ | ◎ | ◎ | ◎ | ◎ |
| in coating process | transfer efficiency | ◎ | ◎ | ◎ | ◎ | ◎ |
| cured film properties | 60° gloss | 90 | 88 | 88 | 89 | 88 |
| | distinctness of image | ○ | ○ | ○ | ○ | ○ |
| | accelerated weathering test 1000 hours | 100 | 100 | 100 | 100 | 100 |
| | 2000 hours | 98 | 97 | 98 | 99 | 97 |
| | 3000 hours | 97 | 94 | 96 | 97 | 95 |

TABLE 34-continued

| Example | 41 | 42 | 43 | 44 | 45 |
|---|---|---|---|---|---|
| gloss 4000 hours | 94 | 93 | 94 | 93 | 93 |
| retention 5000 hours | 91 | 91 | 91 | 92 | 92 |
| (%) 6000 hours | 89 | 90 | 90 | 91 | 90 |
| moisture resistance | ◯ | ◯ | ◯ | ◯ | ◯ |
| xylene rubbing resistance | ◯ | ◯ | ◯ | ◯ | ◯ |
| acid resistance | ◯ | ◯ | ◯ | ◯ | ◯ |
| alkali resistance | ◯ | ◯ | ◯ | ◯ | ◯ |
| oil ink stain    black | ◯ | ◯ | ◯ | ◯ | ◯ |
| resistance         red | ◯ | ◯ | ◯ | ◯ | ◯ |
| pencil hardness (breaking) | 3 H | 4 H | 4 H | 4 H | 3 H |
| pencil hardness (cloud) | F | 2 H | H | 2 H | H |
| adhesive property | ◯ | ◯ | ◯ | ◯ | ◯ |
| appearance of a thick coated | ◯ | ◯ | ◯ | ◯ | ◯ |
| stain property in atomospheric exposure (ΔL) | 1.4 | 0.7 | 0.9 | 1.3 | 1.1 |
| stain after removing stains (ΔL) | 0.2 | 0.1 | 0.0 | 0.1 | 0.1 |

Example 46 through 48

Coating compositions were prepared in the compounding rate shown in Table 35 in the same method as described in Example 17 and cured films were formed on the test panels. Baking conditions and forced drying conditions at forming cured films were shown in Table 35 and the cured film properties were shown in Table 36.

TABLE 35

| Example | | | | 46 | 47 | 48 |
|---|---|---|---|---|---|---|
| compounding rate (parts by weight) | organic-inorganic composite solution | kind (Preparation Example) | | Prep. Ex. 21 | Prep. Ex. 22 | Prep. Ex. 23 |
| | | formulation weight | | 71.6 | 75.0 | 73.8 |
| | silica sol | kind (Preparation Example) | | Prep. Ex. 17 | Prep. Ex. 18 | Prep. Ex. 20 |
| | | formulation weight | | 5.3 | 10.3 | 12.1 |
| | curing agent | UVAN 220 | | 19.1 | — | — |
| | | UVAN 122 | | — | 10.6 | — |
| | | CYMEL 370 | | — | — | 10.2 |
| | solvent | cyclohexanone | | 1.9 | 2.0 | 1.9 |
| | additive | TINUVIN 900 | | 0.8 | 0.8 | 0.8 |
| | | TINUVIN 292 | | 0.2 | 0.2 | 0.2 |
| | | BYK-358 | | 1.0 | 1.0 | 1.0 |
| | curing catalyst | Nacure 4054 | | 0.1 | 0.1 | — |
| | total | | | 100.0 | 100.0 | 100.0 |
| acryl/melamine (weight ratio of non-volatile matter) | | | | 75/25 | 85/15 | 80/20 |
| silica sol non-volatile matter/total non-volatile matter (percent by weight) | | | | 15 | 20 | 25 |
| baking or forced drying condition | temperature (°C.) | | | 140 | 135 | 150 |
| | time (π) | | | 30 | 25 | 25 |

TABLE 36

| Example | | 46 | 47 | 48 |
|---|---|---|---|---|
| operation efficiency in coating process | atomization | ◎ | ◎ | ◎ |
| | transfer efficiency | ◎ | ◎ | ◎ |
| cured film properties | 60° gloss | 89 | 88 | 88 |
| | distinctness of image | ◯ | ◯ | ◯ |
| | accelerated weathering test | 1000 hours | 99 | 100 | 99 |
| | | 2000 hours | 97 | 98 | 97 |
| | | 3000 hours | 94 | 95 | 97 |
| | gloss | 4000 hours | 93 | 94 | 95 |

TABLE 36-continued

| Example | | 46 | 47 | 48 |
|---|---|---|---|---|
| retention 5000 hours | | 93 | 92 | 94 |
| (%) 6000 hours | | 92 | 92 | 93 |
| moisture resistance | | ◯ | ◯ | ◯ |
| xylene rubbing resistance | | ◯ | ◯ | ◯ |
| acid resistance | | ◯ | ◯ | ◯ |
| alkali resistance | | ◯ | ◯ | ◯ |
| oil ink stain    black | | ◯ | ◯ | ◯ |
| resistance         red | | ◯ | ◯ | ◯ |
| pencil hardness (breaking) | | 3 H | 4 H | 4 H |
| pencil hardness (cloud) | | H | H | H |
| adhesive property | | ◯ | ◯ | ◯ |
| appearance of a thick coated | | ◯ | ◯ | ◯ |
| stain property in atomospheric exposure (ΔL) | | 1.4 | 0.8 | 0.6 |
| stain after removing stains (ΔL) | | 0.1 | 0.1 | 0.0 |

Example 49 through 51

Coating compositions were prepared in the compounding rate shown in Table 37 in the same method as described in Example 41 and cured films were formed on the test panels. Baking conditions and forced drying conditions at forming cured films were shown in Table 37 and the cured film properties were shown in Table 38.

TABLE 37

| Example | | | 49 | 50 | 51 |
|---|---|---|---|---|---|
| pigment-dispersed organic-inorganic composite solution | titanium oxide | | 58.3 | 58.3 | 58.3 |
| | organic-inorganic composite solution | | Prep. Ex. 21 | Prep. Ex. 22 | Prep. Ex. 24 |
| | formulation weight | | 34.6 | 34.6 | 37.7 |
| | cyclohexanone | | 7.1 | 7.1 | 1.1 |
| | sub total | | 100.0 | 100.0 | 100.0 |
| compounding ratio (parts by weight) | pigment-dispersed organic-inorganic composite solution described above | | 41.1 | 37.6 | 35.6 |
| | organic-inorganic composite solution | kind (Preparation Example) | Prep. Ex. 21 | Prep. Ex. 22 | Prep. Ex. 24 |
| | | formulation weight | 32.4 | 35.4 | 33.6 |
| | silica sol | untreated silica sol | Prep. Ex. 17 | Prep. Ex. 18 | Prep. Ex. 20 |
| | | Preparation Ex. 15 | 12.8 | 18.8 | 23.1 |
| | curing agent | UVAN 220 | 12.4 | — | — |
| | | UVAN 122 | — | 6.9 | — |
| | | CYMEL 370 | — | — | 6.5 |
| | additive | TINUVIN 292 | 0.2 | 0.2 | 0.2 |
| | | BYK-358 | 1.0 | 1.0 | 1.0 |
| | curing catalyst | Nacure 4054 | 0.1 | 0.1 | — |
| | total | | 100.0 | 100.0 | 100.0 |
| acryl/melamine (weight ratio of non-volatile matter) | | | 75/25 | 85/15 | 80/20 |
| silica sol non-volatile matter/total non-volatile matter (percent by weight) | | | 15 | 20 | 25 |
| baking or forced drying condition | temperature (°C.) | | 140 | 135 | 150 |
| | time (π) | | 30 | 25 | 25 |

TABLE 38

| Example | | 49 | 50 | 51 |
|---|---|---|---|---|
| operation efficiency in coating process | atomization | ◉ | ◉ | ◉ |
| | transfer efficiency | ◉ | ◉ | ◉ |
| cured film properties | 60° gloss | 86 | 85 | 86 |
| | distinctness of image | ○ | ○ | ○ |
| | accelerated weathering test gloss retention (%) | 1000 hours | | | |
| | | 98 | 100 | 99 |
| | 2000 hours | 97 | 97 | 98 |
| | 3000 hours | 95 | 96 | 97 |
| | 4000 hours | 93 | 95 | 94 |
| | 5000 hours | 92 | 95 | 91 |
| | 6000 hours | 90 | 92 | 90 |
| | moisture resistance | ○ | ○ | ○ |
| | xylene rubbing resistance | ○ | ○ | ○ |
| | acid resistance | ○ | ○ | ○ |
| | alkali resistance | ○ | ○ | ○ |
| | oil ink stain resistance  black | ○ | ○ | ○ |
| | red | ○ | ○ | ○ |
| | pencil hardness (breaking) | 4 H | 4 H | 4 H |
| | pencil hardness (cloud) | H | H | 2 H |
| | adhesive property | ○ | ○ | ○ |
| | appearance of a thick coated | ○ | ○ | ○ |
| | stain property in atomospheric exposure (ΔL) | 1.2 | 0.7 | 0.7 |
| | stain after removing stains (ΔL) | 0.1 | 0.0 | 0.1 |

Preparation Example 28

A dispersing component of silica sol dispersed in a solvent was prepared in the same method as described in Preparation Example 17, except that the surface treatment with a silane coupling agent was not carried out in Preparation Example 17. The kind and the amount of ingredients used were shown in Table 39.

TABLE 39

| Preparation Example water-based silica sol | 28 |
|---|---|
| SNOWTEX O initial solvent | 225 |
| isopropyl alcohol continuous dropping solvent | 78.8 |
| isopropyl alcohol | 1500.0 |
| weight of middle stage (parts by weight) | 280 |
| water content of middle stage (% by weight) solvent of second stage | |
| cyclohexanone | 450.0 |
| yield (parts by weight) | 100.0 |
| non-volatile matter (% by weight) | 45.0 |
| water content (% by weight) | 0.1 |

Comparison of Storage Stability

The storage stabilities of the dispersing components of silica sol obtained in Preparation Example 17 to 20 were compared with that of the dispersing component of silica sol obtained in Preparation Example 28. The results were shown in Table 40.

TABLE 40

| dispersing component of silica sol | storage stability |
|---|---|
| Preparation Example 17 | no change |
| Preparation Example 18 | no change |
| Preparation Example 19 | no change |
| Preparation Example 20 | no change |
| Preparation Example 28 | gellation after 3 days |

Example 52

Cationic electrodeposition coat AQUA No.4200® (a product of NOF CORPORATION) was applied by electrodeposition to a soft steel plate treated with zinc phosphate in the amount to form a film having dried thickness of 20 μm and the coated plate was baked at 175° C. for 25 minutes. Intermediate coat EPICO No.1500CP Sealer® (a product of NOF CORPORATION) was applied to the prepared plate by air spraying in the amount to form a film having dried thickness of 40 μm and the plate was baked at 140° C. for 30 minutes. Silver metallic base coating composition, BELCOAT No.6000® (a product of NOF CORPORATION) was applied to the intermediated coat by air spraying in 2 stages with interval of 1 minute 30 seconds in the amount to form a film having dried thickness of 15 μm and the coated pieces were set at 20° C. for 3 minutes to obtain a test panel. Further, the coating composition of Example 33 were diluted with thinner (xylene) to a viscosity required for spraying (25 seconds at 20° C. by Ford cup No.4) and applied to the test panel prepared before by air spraying in the amount to form a film having dried thickness of 40 μm and the test piece was baked at the curing condition of 80° C. for 30 minutes to obtain a test piece having multi layers. Compounding rate of the coating composition, baking condition and forced drying condition at forming cured films were shown in Table 41 and the cured film properties were shown in Table 42.

Example 53

The test piece was formed in the same method as described in Example 52, except that the coating composition of Example 46 was used instead of the coating composition of Example 33. Compounding rate of the coating composition, baking condition and forced drying condition at forming cured films were shown in Table 41 and the cured film properties were shown in Table 42.

Example 54

Cationic electrodeposition coat AQUA No.4200® (a product of NOF CORPORATION) was applied by electrodeposition to a soft steel plate treated with zinc phosphate in the amount to form a film having dried thickness of 20 μm and the coated plate was baked at 175° C. for 25 minutes. Intermediate coat EPICO No.1500CP Sealer® (a product of NOF CORPORATION) was applied to the prepared plate by air spraying in the amount to form a film having dried thickness of 40 μm and the plate was baked at 140° C. for 30 minutes. Silver metallic base coating composition, BELCOAT No.6000® (a product of NOF CORPORATION) was applied to the intermediated coat by air spraying in 2 stages with interval of 1 minute 30 seconds in the amount to form a film having dried thickness of 15 μm and the coated pieces were set at 20° C. for 3 minutes. Further, the clear coating composition of an acrylic resin/aminoplast resin coating composition, BELCOAT No.6000 CLEAR COAT® (a product of NOF CORPORATION, ratio by weight of acrylic resin to aminoplast resin: 70/30) was applied by air spraying in the amount to form a film having dried thickness of 30 μm and the plate was baked at 140° C. for 30 minutes. Further more, as an over-clear coating composition, the coating composition of Example 35 were diluted with thinner (xylene) to a viscosity required for spraying (25 seconds at 20° C. by Ford cup No.4) and applied to the test panel prepared before by air spraying in the amount to form a film having dried thickness of 10 μm and the test piece was baked at the curing condition of 80° C. for 30 minutes to obtain a test piece having multi layers. Compounding rate of the coating composition, baking condition and forced drying condition at forming cured films were shown in Table 41 and the cured film properties were shown in Table 42.

Example 55

The test piece was formed in the same method as described in Example 54, except that the coating composition of Example 48 was used instead of the coating composition of Example 35. Compounding rate of the coating composition, baking condition and forced drying condition at forming cured films were shown in Table 41 and the cured film properties were shown in Table 42.

TABLE 41

| Example | | | 52 | 53 | 54 | 55 |
|---|---|---|---|---|---|---|
| compounding rate (parts by weight) | organic-inorganic composite solution | kind (Preparation Example) | Prep. Ex. 21 | Prep. Ex. 21 | Prep. Ex. 23 | Prep. Ex. 23 |
| | | formulation weight | 78.9 | 71.6 | 82.8 | 73.8 |
| | silica sol | kind (Preparation Example) | Prep. Ex. 17 | Prep. Ex. 17 | Prep. Ex. 19 | Prep. Ex. 20 |
| | | formulation weight | 5.2 | 5.3 | 0.4 | 12.1 |
| | curing agent | DURANATE THA-100 | 11.0 | — | 11.8 | — |
| | | DURANATE 24A-100 | — | — | — | — |
| | | DESMODUR BL-3175 | — | — | — | — |
| | | UVAN 220 | — | 19.1 | — | — |
| | | UVAN 122 | — | — | — | — |
| | | CYMEL 370 | — | — | — | 10.2 |
| | solvent additives | cyclohexanonel | 1.9 | 1.9 | 2.0 | 1.9 |
| | | TINUVIN 900 | 0.8 | 0.8 | 0.8 | 0.8 |
| | | TINUVIN 292 | 0.2 | 0.2 | 0.2 | 0.2 |
| | | BYK-358 | 1.0 | 1.0 | 1.0 | 1.0 |
| | curing catalyst | SCAT-8 (10% by weight solution) | — | — | — | — |
| | | SCAT-8 (1% by weight solution) | 1.0 | — | 1.0 | — |
| | | Nacure 4054 | — | 0.1 | — | — |
| | total | | 100.0 | 100.0 | 100.0 | 100.0 |
| NCO/OH (mole ratio) | | | 1.0 | — | 1.2 | — |
| acryl/melamine (weight ratio of non-volatile matter) | | | — | 75/25 | — | 80/20 |
| silica sol non-volatile matter/total non-volatile matter (percent by weight) | | | 15 | 15 | 20 | 25 |
| baked or forced drying condition | temperature | | 80 | 140 | 80 | 150 |
| | time (π) | | 25 | 30 | 30 | 25 |

TABLE 42

| Example | | 52 | 53 | 54 | 55 |
|---|---|---|---|---|---|
| operation efficiency in coating process | atomization | ⊚ | ⊚ | ⊚ | ⊚ |
| | transfer efficiency | ⊚ | ⊚ | ⊚ | ⊚ |
| cured 60° gloss | | 92 | 93 | 92 | 93 |

TABLE 42-continued

| Example | | | 52 | 53 | 54 | 55 |
|---|---|---|---|---|---|---|
| film properties | distinctness of image | | ○ | ○ | ○ | ○ |
| | accelerated weathering test | 1000 hours | 100 | 100 | 99 | 100 |
| | | 2000 hours | 97 | 98 | 97 | 98 |
| | | 8000 hours | 96 | 95 | 96 | 97 |
| | gloss retention (%) | 4000 hours | 92 | 94 | 92 | 94 |
| | | 5000 hours | 91 | 91 | 91 | 91 |
| | | 6000 hours | 90 | 90 | 89 | 90 |
| | moisture resistance | | ○ | ○ | ○ | ○ |
| | xylene rubbing resistance | | ○ | ○ | ○ | ○ |
| | acid resistance | | ○ | ○ | ○ | ○ |
| | alkali resistance | | ○ | ○ | ○ | ○ |
| | oil ink stain resistance | black | ○ | ○ | ○ | ○ |
| | | red | ○ | ○ | ○ | ○ |
| | pencil hardness (breaking) | | 3 H | 4 H | 4 H | 4 H |
| | pencil hardness (cloud) | | F | F | F | F |
| | adhesive property | | ○ | ○ | ○ | ○ |
| | appearance of a thick coated | | ○ | ○ | ○ | ○ |
| | stain property in atomospheric exposure (ΔL) | | 1.3 | 1.4 | 1.0 | 0.8 |
| | stain after removing stains (ΔL) | | 0.1 | 0.1 | 0.0 | 0.1 |

The coating compositions of the present invention comprise ceramic ingredients and give the cured films having excellent weathering resistance, light resistance, stain resistance, stain-removing property, chemical resistance, moisture resistance and appearance and is excellent in environment friendliness and safety.

What is claimed is:

1. A coating composition which comprises:
   (A) a resin having a glass transition temperature of 50 to 120° C., a number average molecular weight of 2,000 to 100,000, a hydroxyl value of 50 to 150 mgKOH/g and an acid value of 1 to 25 mgKOH/g, which is produced by copolymerizing monomers comprising 10 to 90 percent by weight of (a) a (meth)acrylic acid ester of an alkyl alcohol of 1 to 12 carbon atoms, 10 to 50 percent by weight of (b) a first polymerizable double bond-containing and hydroxyl group-containing monomer, 0.1 to 10 percent by weight of (c) a polymerizable double bond-containing and carboxyl group-containing monomer, 0 to 20 percent by weight of (d) styrene, 0 to 20 percent by weight of (e) acrylonitrile and 0 to 10 percent by weight of (f) a second polymerizable double bond-containing monomer,
   (B) at least one compound selected from the group consisting of (i) a polyisocyanate compound having two or more isocyanate groups selected from the group consisting of blocked isocyanate groups, unblocked isocyanate groups and a combination of blocked isocyanate groups and unblocked isocyanate groups, in the molecule and (ii) an aminoplast resin,
   (C) a dispersing component of at least one inorganic oxide sol selected from the group consisting of an aluminum oxide sol, a silica sol, a zirconium oxide sol and an antimony oxide sol, wherein the dispersing component has an amount of nonvolatile matter of 5 to 60 percent by weight based on a total amount of nonvolatile matter of the resin (A), the compound (B) and the dispersing component (C),
   when the compound (B) is said polyisocyanate, a mole ratio of said isocyanate groups in said polyisocyanate to hydroxyl groups in said resin (A) is 0.6 to 1.6, when the compound (B) is said aminoplast resin, a weight ratio of nonvolatile matter in said resin (A) to said compound (B) is 97:3 to 60:40.

2. The coating composition as claimed in claim 1, wherein the dispersing component of the inorganic oxide sol is surface-treated with a silane coupling agent.

3. The coating composition as claimed in claim 1, wherein the dispersing component of the inorganic oxide sol is produced by dehydrating water contained in an aqueous inorganic oxide sol by an azeotropic distillation with an azeotropic solvent to water and then surface-treating the dispersing component of the inorganic oxide sol with a silane coupling agent.

4. The coating composition as claimed in claim 1, wherein the dispersing component of the inorganic oxide sol is added into a polymerization liquid containing the resin (A) after the resin (A) is produced by a copolymerization of the monomers.

5. The coating composition as claimed in claim 1, wherein the compound (B) is the polyisocyanate compound and the mole ratio of the isocyanate groups in the compound (B) to hydroxyl groups in the resin (A) is 0.6 to 1.6.

6. The coating composition as claimed in claim 1, wherein the compound (B) is the aminoplast resin and the weight ratio of the nonvolatile matter of the resin (A) and the compound (B) is 97:3 to 60:40.

7. The coating composition as claimed in claim 1, wherein the dispersing component of the inorganic oxide sol is the dispersing component of silica sol.

8. The coating composition as claimed in claim 1, wherein an average particle diameter of the dispersing component of silica sol is not more than 100 nm.

9. The coating composition as claimed in claim 1, wherein the coating composition further comprises a curing reaction catalyst.

10. The coating composition as claimed in claim 1, wherein the coating composition further comprises a pigment.

11. A process for preparing a coating composition which comprises:

(i) copolymerizing monomers comprising 10 to 90 percent by weight of (a) a (meth) acrylic acid ester of an alkyl alcohol of 1 to 12 carbon atoms, 10 to 50 percent by weight of (b) a polymerizable double bond-containing and hydroxyl group-containing monomer, 0.1 to 10 percent by weight of (c) a polymerizable double bond-containing and carboxyl group-containing monomer, 0 to 20 percent by weight of (d) styrene, 0 to 20 percent by weight of (e) acrylonitrile and 0 to 10 percent by weight of (f) other polymerizable double bond-containing monomer to produce a resin (A) having a glass transition temperature of 50 to 120° C., a number average molecular weight of 2,000 to 100,000, a hydroxyl value of 50 to 150 mgKOH/g and an acid value of 1 to 25 mgKOH/g, (ii) adding to the resin (A) a dispersing component of at least one inorganic oxide sol (C) selected from the group consisting of an aluminum oxide sol, a silica sol, a zirconium oxide sol and an antimony oxide sol into a polymerization liquid containing the resin (A) in an amount of 5 to 60 percent by weight as nonvolatile matter based on a total amount of nonvolatile matter to produce an organic-inorganic composite, and (iii) then mixing with the organic-inorganic composite at least one compound (B) selected from the group consisting of a polyisocyanate compound having two or more blocked or unblocked isocyanate groups in the molecule and an aminoplast resin.

12. The process for preparing the coating composition as claimed in claim 11, wherein the addition of the dispersing component of the inorganic oxide sol (C) to the polymerization liquid containing the resin (A) is conducted at a temperature of not more than a boiling point of a dispersion medium of the dispersing component (C).

13. The coating composition as claimed in claim 1, wherein said resin (A) has a glass transition temperature of 50 to 100° C., a number average molecular weight of 2,200 to 70,000, a hydroxyl value of 50 to 130 mgKOH/g and an acid value of 2 to 20 mgKOH/g.

14. The coating composition as claimed in claim 13, wherein for said resin (A), said component (a) is in an amount of 35 to 80 weight %, said component (b) is in an amount of 10 to 30 weight %, said component (c) is in an amount of 1 to 5 weight %, said styrene of said component (d) is in an amount of 1 to 18 weight %, said acrylonitrile of said component (e) is in an amount of 1 to 18 weight % and said component (f) is in an amount of 1 to 7 weight %.

15. The coating composition as claimed in claim 14, wherein when said compound (B) is a polyisocyanate compound, the mole ratio of said isocyanate groups in said polyisocyanate to said hydroxyl groups in said resin (A) is 0.8 to 1.2; when said compound (B) is said aminoplast resin, the weight ratio of nonvolatile matter in said resin (A) to said compound (B) is 95:5 to 65:35.

16. The coating composition as claimed in claim 15, wherein the dispersing component has 5 to 40 percent by weight of nonvolatile matter based on a total amount of nonvolatile matter in said resin (A).

* * * * *